US009628503B2

(12) United States Patent
Cai et al.

(10) Patent No.: US 9,628,503 B2
(45) Date of Patent: Apr. 18, 2017

(54) SYSTEMS AND METHODS FOR NETWORK DESTINATION BASED FLOOD ATTACK MITIGATION

(71) Applicant: F5 Networks, Inc., Seattle, WA (US)

(72) Inventors: Hao Cai, Sammamish, WA (US); William Ross Baumann, Seattle, WA (US); Paul I. Szabo, Shoreline, WA (US); Timothy Scott Michels, Greenacres, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 14/597,850

(22) Filed: Jan. 15, 2015

(65) Prior Publication Data
US 2015/0207815 A1    Jul. 23, 2015

Related U.S. Application Data

(60) Provisional application No. 61/928,892, filed on Jan. 17, 2014.

(51) Int. Cl.
H04L 29/06    (2006.01)

(52) U.S. Cl.
CPC ...... *H04L 63/1441* (2013.01); *H04L 63/1416* (2013.01); *H04L 63/1458* (2013.01);
(Continued)

(58) Field of Classification Search
CPC . H04L 63/14; H04L 63/1408; H04L 63/1416; H04L 63/1441; H04L 63/1458; H04L 63/1466
See application file for complete search history.

(56) References Cited

U.S. PATENT DOCUMENTS 7,278,159 B2    10/2007   Kaashoek et al.
9,027,129 B1*    5/2015   Kancherla ........... H04L 63/1458
                                                          726/22

(Continued)

FOREIGN PATENT DOCUMENTS

EP    1154610 A2    11/2001

OTHER PUBLICATIONS

Search Report and Written Opinion for PCT application PCT/US2015/011596 mailed on Apr. 24, 2015 (15 pages).
(Continued)

*Primary Examiner* — Kambiz Zand
*Assistant Examiner* — Ayoub Alata
(74) *Attorney, Agent, or Firm* — John W. Branch; Lowe Graham Jones PLLC

(57) ABSTRACT

Embodiments are directed towards network address based flood attack mitigation methods. A PTMD disposed between one or more computers may monitor several network flows and generate metrics associated with malicious network activity, such as, flood attacks. If flood attacks are determined to be occurring, the PTMD may determine the network addresses targeted by the flood attack. Further, the PTMD may activate flood attack mitigation procedures for the targeted network addresses such that other network addresses associated with the monitored network flows are excluded from the flood attack mitigation procedure. The PTMD may monitor the network traffic subsequently communicated to the targeted network addresses. Accordingly, the PTMD may determine if the flood attack has ceased based on characteristics of the monitored network traffic. If the flood attack has ceased, the flood attack mitigation procedures for the targeted network addresses may be deactivated.

28 Claims, 11 Drawing Sheets

(52) U.S. Cl.
CPC .......... *H04L 63/1466* (2013.01); *H04L 63/14* (2013.01); *H04L 63/1408* (2013.01)

(56) References Cited

U.S. PATENT DOCUMENTS

| | | | |
|---|---|---|---|
| 2009/0037592 A1* | 2/2009 | Lyon | H04L 29/06027 709/228 |
| 2012/0311664 A1 | 12/2012 | Elrod et al. | |
| 2013/0055374 A1* | 2/2013 | Kustarz | H04L 63/1458 726/13 |
| 2013/0294239 A1 | 11/2013 | Szabo et al. | |

OTHER PUBLICATIONS

F5 Networks, "Big-IP Local Traffic Manager Concepts Version 11.4" https://support.f5.com/kb/en-us/products/big-ip_ltm/manuals/product/ltm-product/ltm-concepts-11-4-0.html, publication date Nov. 12, 2014, accessed on May 4, 2015 (178 pages).

F5 Networks, "Big-IP Local Traffic Manager: Implementations Version 11.4" https://support.f5.com/kb/en-us/products/big-ip_ltm/manuals/product/ltm-implementations-11-4-0.html, publication date Nov. 20, 2013, accessed on May 4, 2015 (234 pages).

F5 Networks, "Big-IP Advance Routing Bidirectional Forwarding Detection Configuration Guide Version 7.8.4" https://support.f5.com/kb/en-us/products/big-ip_ltm/manuals/related/arm-bfd-configuration-7-8-4.html, publication date Sep. 17, 2013, accessed on May 4, 2015 (32 pages).

International Search Report and Written Opinion for International Patent Application No. PCT/US2015/011596, mailed on Apr. 24, 2015. (15 pages).

\* cited by examiner

SYSTEMS AND METHODS FOR NETWORK DESTINATION BASED FLOOD ATTACK MITIGATION

CROSS-REFERENCE TO RELATED APPLICATIONS

This application is a Utility Patent application based on a previously filed U.S. Provisional Patent Application U.S. Ser. No. 61/928,892 filed on Jan. 17, 2014, entitled "SYSTEMS AND METHODS FOR NETWORK DESTINATION BASED FLOOD ATTACK MITIGATION," the benefit of the filing date of which is hereby claimed under 35 U.S.C. §119(e) and which is further incorporated by reference in its entirety.

TECHNICAL FIELD

The present invention relates generally to network traffic management and, more particularly, but not exclusively to methods for network traffic management during flood attacks.

BACKGROUND

Often, a client computer establishes a network connection with a server computer by using well-known protocols, such as Transmission Control Protocol/Internet Protocol ("TCP/IP"), User Datagram Protocol ("UDP"), and the like. Traffic managers may be enabled to provide one or more network flow control operations for computers communicating over a network. Flood attacks and other malicious network activity communicated to traffic managers may interfere with efficient network flow control operations. Even though there may be standard and/or non-methods available for mitigating the impact of flood attacks, such as, SYN flood attacks, sometimes the mitigation efforts may negatively impact network performance. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF VARIOUS EMBODIMENTS

Figure 1:
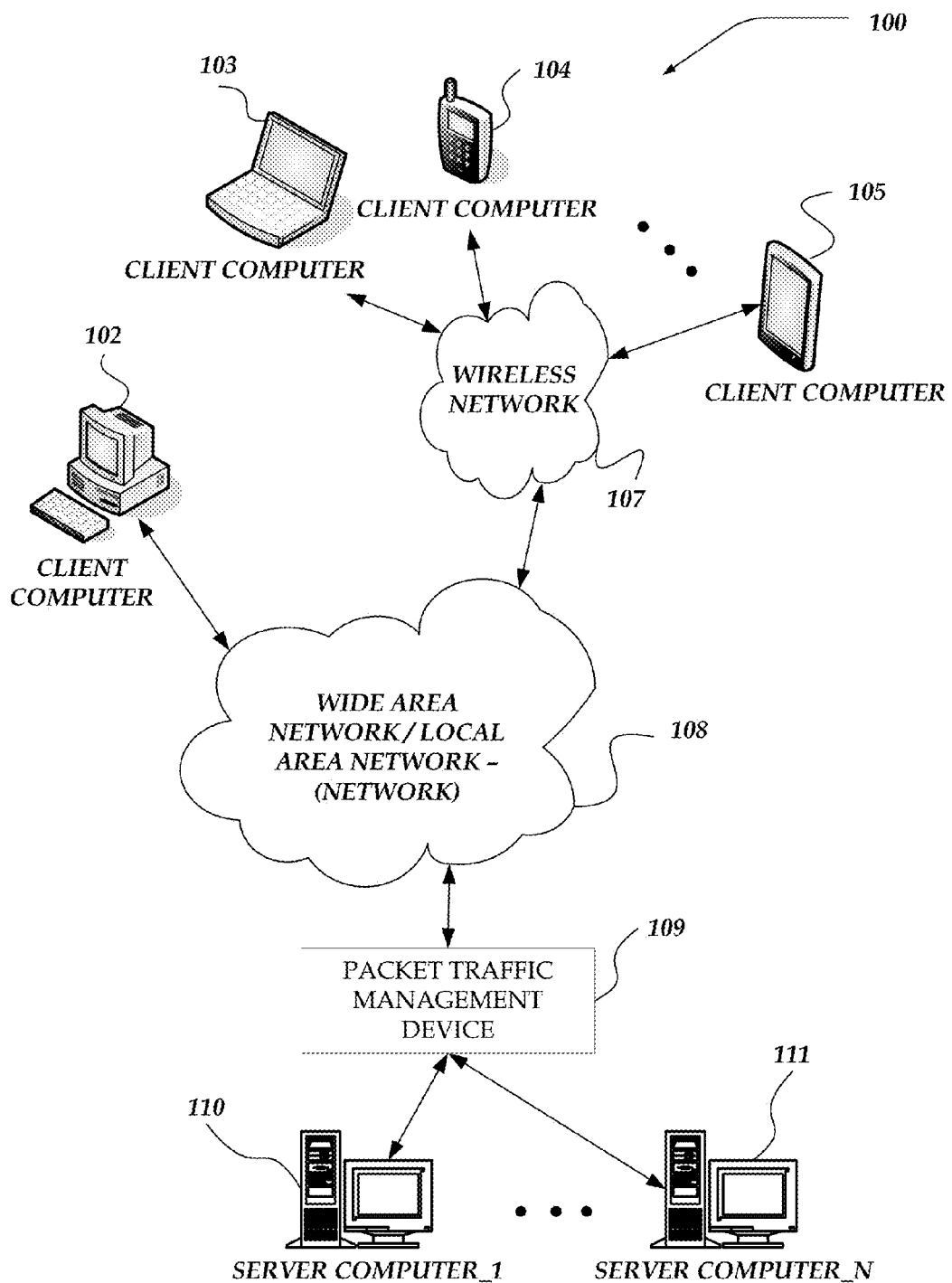
FIG. 1 is a system diagram of an environment in which embodiments of the invention may be implemented.

The present innovations now will be described more fully hereinafter with reference to the accompanying drawings, which form a part hereof, and which show, by way of illustration, specific embodiments by which the invention may be practiced. These innovations may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present innovations may be embodied as methods, computers, or devices. Accordingly, the present innovations may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the innovations may be readily combined, without departing from the scope or spirit of the innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "SYN" refers to a packet transmitted utilizing TCP that includes a set synchronize control flag in a TCP header of the packet.

As used herein, the term "ACK" refers to a packet transmitted utilizing TCP that includes a set acknowledgment flag in a TCP header of the packet.

As used herein, the term "SYN_ACK" refers to a packet transmitted utilizing TCP that includes a set synchronize control flag and a set acknowledgment flag in a TCP header of the packet.

As used herein, the term "FIN" refers to a packet transmitted utilizing TCP that includes a set no more data from sender flag in a TCP header of the packet.

As used herein, the term "FIN_ACK" refers to a packet transmitted utilizing TCP that includes a set no more data from sender flag and a set acknowledgment flag in a TCP header of the packet. FIN_ACK compress a FIN and ACK into one TCP packet.

As used herein, the term "tuple" refers to a set of values that identify a source and destination of a connection. In one embodiment, a 5 tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. In at least one of the various embodiments, source port numbers may be a TCP source port number. Likewise, in at least one of the various embodiments, destination port number may be a TCP destination port number. In at least one of the various embodiments, tuples may be used to identify network flows (e.g., connection flows). However, a tuple need not be a 5 tuple, and other combinations of the above may also be used. For example, a tuple may be a four-tuple, using a source IP address, a destination IP address, a source port number, and a destination port number. Other combinations are also considered. Moreover, as used herein, a "flow key" refers to key that may be generated based on a tuple comprising any combination of fields selected from within a network packet header, including those fields identified above.

As used herein, the terms "network flow," "connection flow,", "flow" may refer to a network session established between two endpoints. In at least one of the various embodiments, a tuple may describe the flow. In at least one of the various embodiments, flow control data associated with connection flows may be used to ensure that the network packets sent between the endpoints of a connection flow may be routed along the same path. In at least one of the various embodiments, the performance of connection oriented network protocols such as TCP/IP may impaired if network packets may be routed using varying paths and/or directed different endpoints. Further, one or more protocol options may be associated with a flow enabling the endpoints to employ one or more features of the protocol that may be otherwise optional.

As used herein, the term "genuine connection flow," refers to a connection flow that may have been determined to be associated with an operative client-server communication session. In contrast, a non-genuine connection flow may be associated with a malicious attack such as a SYN flood attack. In at least one of the various embodiments, characteristics a genuine connection flows may include, TCP/IP handshaking complete, evidence of bi-directional network packet exchange, or the like. Likewise, evidence that a connection flow may be non-genuine may include, half-open connections (incomplete handshaking and connection setup), few if any network packets exchanged, or the like.

As used herein, the term "high speed flow cache" refers to memory based cache used for storing flow control data that corresponds to connection flows. The cache may be accessible using, dedicated busses that may provide very fast performance based on a combination of factors that may include, wide-busses, fast clock speeds, dedicated channels, specialized read and/or write buffer, hardware proximity, temperature control, or the like. Also, the high speed flow cache may be comprised of very fast random access memory (RAM) components such as, static random access memory (SRAM), asynchronous SRAM, burst SRAM, extended data output dynamic RAM (EDO DRAM), or the like. In most cases, the high performance characteristics of the high speed flow cache often are very expensive and comprise valuable "real estate" within a traffic management device.

As used herein, the term "flood attack" refers to malicious attacks on a network computer. In at least one of the various embodiments, such attacks often entail a high volume of connection opening and/or connection establishing commands being sent to a network computer where the handshake to complete the connection is not be completed. Also, flood attacks may comprise attacks that complete the connection handshake but the client endpoint does not send subsequent data and/or the endpoint has been spoofed and does not actually represent a genuine connection endpoint. In some cases, because the attacking client does not respond to the network computer, the network computer must wait for an inactivity timeout condition to be reached before removing the non-genuine connection.

In at least one of the various embodiments, the general goal of flood attacks is to fill up (e.g., flood) the network computer with inoperative non-genuine network connections to impair the ability of the network computer to operate and/or process genuine network connections. SYN flood attacks (e.g., SYN flooding) are flood attacks that may be targeted at network computers that support TCP/IP.

As used herein the term "flood attack mitigation," "flood attack mitigation procedure," "flood protection" refer to one or more procedures that may be performed by a PTMD if a flood attack may be detected. In at least one of the various embodiments, depending on various factors, such as, the network protocols being employed, the type of flood attack, available source/destination information, or the like, one or more procedures for mitigating flood attacks may be activated. For example, if the flood attacks may be directed at network addresses using the TCP protocol, the TCP feature SYN Cookie may be activated for those network addresses. In other embodiments, denial of service attack mitigation procedures, such as, rate limiting, traffic priority demotion, or the like, may also be enabled as part of flood attack mitigation.

As used herein the "network destination," or "network address" refer to a name or number used to identify one or more items, objects, services, and/or locations in a communication network. In some cases, the network destination and/or network address may represent a single unique endpoint on the network. In other cases, the network destination and/or network address may represent one or more endpoints each sharing one or more similar network communication attributes and/or characteristics. In at least one of the various embodiments, elements that comprise tuples may be considered network destinations and/or components of a network destination. Also, network destinations may be defined using one or more sub-networking masks, wildcards, matching patterns, or the like. Network communication/monitoring/metrics may be directed to one or more network destinations. Likewise, flood attacks and/or flood attack mitigation procedures may be directed to one or more network destinations. In the interest of brevity, for the purposes of these innovations, network destinations and network addresses may be considered to have the same definition.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards network destination based flood attack mitigation methods. In at least one of the various embodiments, a PTMD may be disposed between one or more computers in a networking environment. In at least one of the various embodiments, the PTMD may be arranged and/or configured to monitor several network flows and generate one or more metrics that may be associated with one or more malicious network events, such as, flood attacks. Accordingly, the PTMD may be arranged to determine if flood attack may be occurring based on one or more of metrics exceeding one or more defined thresholds.

In at least one of the various embodiments, the PTMD may be arranged to determine the network destinations that may be targeted by a flood attack. In at least one of the various embodiments, the PTMD may determine the targeted network destinations by extracting a portion of the network destination information from at least one captured SYN packet. Further, in at least one of the various embodiments, the PTMD may activate at least one flood attack mitigation procedure, such as, in at least one of the various embodiments, enabling SYN-Cookies for the at least one targeted network destination, for the targeted network destinations such that the other network destinations that may be associated with the monitored network flows may be excluded from the flood attack mitigation procedure if they are free from a flood attack.

In at least one of the various embodiments, the PTMD may be arranged to monitor the network traffic that may be subsequently communicated to the targeted network destinations. Accordingly, in at least one of the various embodiments, the PTMD may determine if the flood attack has ceased based on one or more characteristics of the monitored network traffic provided to the targeted network destinations. If the flood attack has ceased, the PTMD may be arranged to deactivate the flood attack mitigation procedures for the targeted network destinations.

In at least one of the various embodiments, one of the metrics associated with flood attacks may include a ratio of incoming SYN packets to the number of SYN_ACK packet errors, such as, unanswered outbound SYN_ACK packets or answered outbound SYN_ACK packets answered using incorrect signatures that occur within a defined time window.

In at least one of the various embodiments, the PTMD may be arranged and/or configured to aggregate one or more of the metrics into buckets based on a hash key such that the hash key may be generated based on the network destinations associated with the monitored network flows.

In at least one of the various embodiments, the PTMD may be arranged to enable a code segment (CS) of the PTMD to provide status messages to a data flow segment (DFS) of the PTMD that include network destination information and an indicator to activate the at least one flood control mitigation procedure on the DFS.

Further, in at least one of the various embodiments, innovations included herein are envisaged to be applicable to other malicious network activity in addition to flood attacks. Accordingly, in at least one of the various embodiments, other malicious activity directed at particular network destinations may be addressed similarly, including but not limited to, denial of service attacks, or the like, enabling the relevant mitigation procedures to be limited to just the network destinations that may be targeted by the malicious activity.

Illustrative Operating Environment

FIG. 1 shows components of one embodiment of an environment in which the invention may be practiced. Not all of the components may be required to practice these innovations, and variations in the arrangement and type of the components may be made without departing from the spirit or scope of the invention.

As shown, system 100 of FIG. 1 includes local area networks ("LANs")/wide area networks ("WANs")-(network) 108, wireless network 107, client computers 102-105, packet traffic management device ("PTMD") 109, and server computers 110-111. Network 108 is in communication with and enables communication between client computers 102-105, wireless network 107, and PTMD 109. Wireless network 107 further enables communication with wireless devices, such as client computers 103-105. PTMD 109 is in communication with network 108 and server computers 110-111.

One embodiment of client computers 102-105 is described in more detail below in conjunction with FIG. 2. In one embodiment, at least some of client computers 102-105 may operate over wired and/or a wireless networks, such as networks 107 and/or 108. Generally, client computers 102-105 may include virtually any computing device, or computer capable of communicating over a network. It should be recognized that more or less client computers may be included within a system such as described herein, and embodiments are therefore not constrained by the number or type of client computers employed.

Computers that may operate as client computer 102 may include computers that typically connect using a wired or wireless communications medium, such as personal computers, servers, multiprocessor systems, microprocessor-based or programmable consumer electronics, network PCs, or the like. In some embodiments, client computers 102-105 may include virtually any portable computing computer, or computer, capable of connecting to another computing device, or computer and communicating information, such as laptop computers, smart phones, mobile computers, tablet computers, or the like. However, client computers are not so limited and may also include other portable devices, such as cellular telephones, display pagers, radio frequency ("RF") devices, infrared ("IR") devices, Personal Digital Assistants ("PDAs"), wearable computers, integrated devices combining one or more of the preceding devices, and the like. As such, client computers 102-105 typically range widely in terms of capabilities and features. Moreover, client computers 102-105 may provide access to various computing applications, including a browser, or other web-based applications.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client computer may employ the browser application to perform various activities over a network (online). However, another application resident on the client computer may also be used to perform various online activities.

Client computers 102-105 also may include at least one other client application that is configured to communicate by receiving and/or sending data with one or more other computing devices and/or computers. The client application may include a capability to send and/or receive content, or the like. The client application may further provide information that identifies itself, including a type, capability, name, or the like. In one embodiment, client computers 102-105 may uniquely identify themselves through any of a variety of mechanisms, including a phone number, network address, MAC address, Mobile Identification Number ("MIN"), an electronic serial number ("ESN"), or other mobile device identifier. The information may also indicate a content format that the client computer is enabled to employ. Such information may be provided in a network packet, or the like, sent between other client computers, PTMD 109, server computers 110-111, or other computing devices.

Client computers 102-105 may further be configured to include a client application that enables an end-user to log into an end-user account that may be managed by another computer, such as server computers 110-111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless network 107 is configured to couple client computers 103-105 and its components with network 108. Wireless network 107 may include any of a variety of wireless sub-networks that may further overlay stand-alone ad-hoc networks, and the like, to provide an infrastructure-oriented connection for client computers 102-105. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) $5^{th}$ (5G) generation radio access for cellular systems, WLAN, Wireless Router ("WR") mesh, and the like. Access technologies such as 2G, 3G, 4G, 5G, and future access networks may enable wide area coverage for mobile computers, such as client computers 103-105 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, wireless network 107 may include virtually any wireless communication mechanism by which information may travel between client computers 103-105 and another computing device, computer, network, and the like.

Network 108 is configured to couple network computers with other computing devices, and/or computers, including, server computers 110-111 through PTMD 109, client computer 102, and client computers 103-105 through wireless network 107. Network 108 is enabled to employ any form of computer readable media for communicating information from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3,and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices and/or computers.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of PTMD 109 is described in more detail below in conjunction with FIG. 3. Briefly, however, PTMD 109 may include virtually any network computer capable of managing network traffic between client computers 102-105 and server computers 110-111. Such computers include, for example, routers, proxies, firewalls, load balancers, cache devices, devices that perform network address translation, or the like, or any combination thereof. PTMD 109 may perform the operations of routing, translating, switching packets, network address translation, firewall services, network flow control, or the like. In one embodiment, PTMD 109 may inspect incoming network packets, and may perform an address translation, port translation, a packet sequence translation, and the like, and route the network packets based, at least in part, on the packet inspection. In some embodiments, PTMD 109 may perform load balancing operations to determine a server computer to direct a request. Such load balancing operations may be based on network traffic, network topology, capacity of a server, content requested, or other traffic distribution mechanisms.

PTMD 109 may include a control segment and a separate data flow segment. The control segment may include software-optimized operations that perform high-level control functions and per-flow policy enforcement for packet traffic management. In at least one of the various embodiments, the control segment may be configured to manage connection flows maintained at the data flow segment. In at least one of the embodiments, the control segment may provide instructions, such as, for example, a packet translation instruction, to the data flow segment to enable the data flow segment to route received packets to a server computer, such as server computer 110-111. The data flow segment may include hardware-optimized operations that perform statistics gathering, per-packet policy enforcement (e.g., packet address translations), high-speed flow caches, or the like, on connection flows maintained at DFS between client computers, such as client computers 102-105, and server computers, such as server computers 110-111.

Server computers 110-111 may include virtually any network computer that may operate as a website server. However, server computers 110-111 are not limited to website servers, and may also operate as messaging server, a File Transfer Protocol (FTP) server, a database server, content server, application server, or the like. Additionally, each of server computers 110-111 may be configured to perform a different operation. Computers that may operate as server computers 110-111 include various network computers, including, but not limited to personal computers, desktop computers, multiprocessor systems, microprocessor-based or programmable consumer electronics, network PCs, server computers, network appliances, and the like.

Although FIG. 1 illustrates server computers 110-111 as single computers, the invention is not so limited. For example, one or more functions of each of server computers 110-111 may be distributed across one or more distinct network computers. Moreover, server computers 110-111 are not limited to a particular configuration. Thus, in one embodiment, server computers 110-111 may contain a plurality of network computers that operate using a master/slave approach, where one of the plurality of network computers of server computers 110-111 operate to manage and/or otherwise coordinate operations of the other network computers. In other embodiments, the server computers 110-111 may operate as a plurality of network computers within a cluster architecture, a peer-to-peer architecture, a cloud architecture, or the like. Thus, the invention is not to be construed as being limited to a single environment, and other configurations, and architectures are also envisaged.

Illustrative Client Computer

Figure 2:
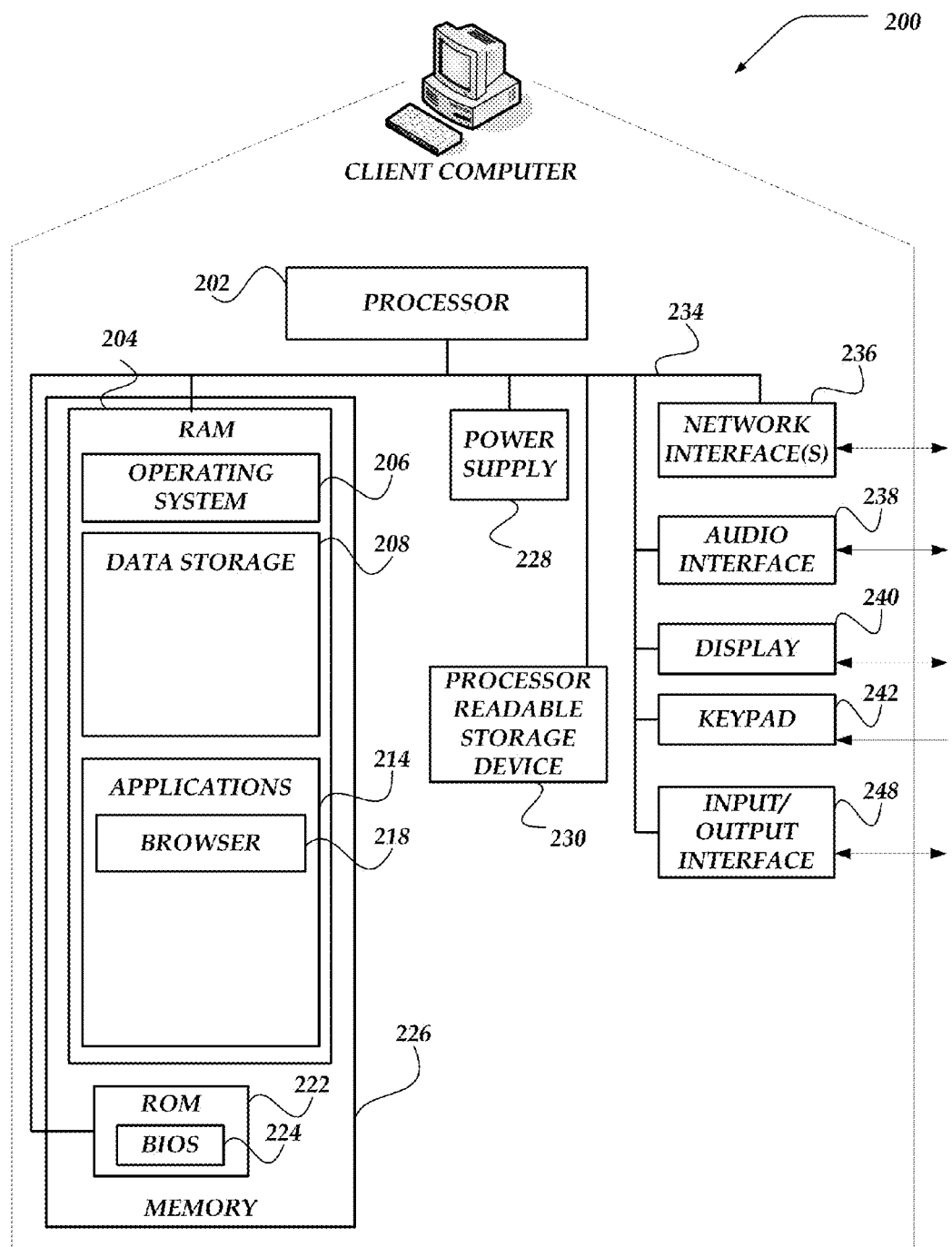
FIG. 2 shows an embodiment of a client computer that may be included in a system such as that shown in FIG. 1.

FIG. 2 shows one embodiment of client computer 200 that may be included in a system implementing embodiments of the invention. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with memory 226 via a bus 234. Client computer 200 also includes a power supply 228, one or more network interfaces 236, an audio interface 238, a display 240, a keypad 242, and an input/output interface 248.

Power supply 228 provides power to client computer 200. A rechargeable or non-rechargeable battery may be used to provide power. The power may also be provided by an external power source, such as an AC adapter or a powered docking cradle that supplements and/or recharges a battery.

Client computer 200 may optionally communicate with a base station (not shown), or directly with another computing device and/or computer. Network interface 236 includes circuitry for coupling client computer 200 to one or more networks, and is constructed for use with one or more communication protocols and technologies including, but not limited to, global system for mobile communication ("GSM"), code division multiple access ("CDMA"), time division multiple access ("TDMA"), High Speed Downlink Packet Access ("HSDPA"), Long Term Evolution ("LTE"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), or any other type of display used with a computing device and/or computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Client computer 200 may also include a GPS transceiver (not shown) to determine the physical coordinates of client computer 200 on the surface of the Earth. A GPS transceiver typically outputs a location as latitude and longitude values. However, the GPS transceiver can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client computer 200 on the surface of the Earth. It is understood that under different conditions, a GPS transceiver can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control ("MAC") address, IP address, or the like.

Memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another device or computer based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. At least a portion of the information may also be stored on another component of network computer 200, including, but not limited to processor readable storage device 230, a disk drive or other computer readable storage medias (not shown) within client computer 200.

Processor readable storage device 230 may include volatile, nonvolatile, non-transitory, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device and/or computer. Processor readable storage device 230 may also be referred to herein as computer readable storage media.

Applications 214 may include computer executable instructions which, when executed by client computer 200, transmit, receive, and/or otherwise process network data. Network data may include, but is not limited to, messages (e.g., SMS, Multimedia Message Service ("MMS"), instant message ("IM"), email, and/or other messages), audio, video, and enable telecommunication with another user of another client computer. Applications 214 may include, for example, browser 218. Applications 214 may include other applications, which may include, but are not limited to, calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as PTMD 109 and/or indirectly with server computers 110-111.

Illustrative Network Computer

Figure 3:
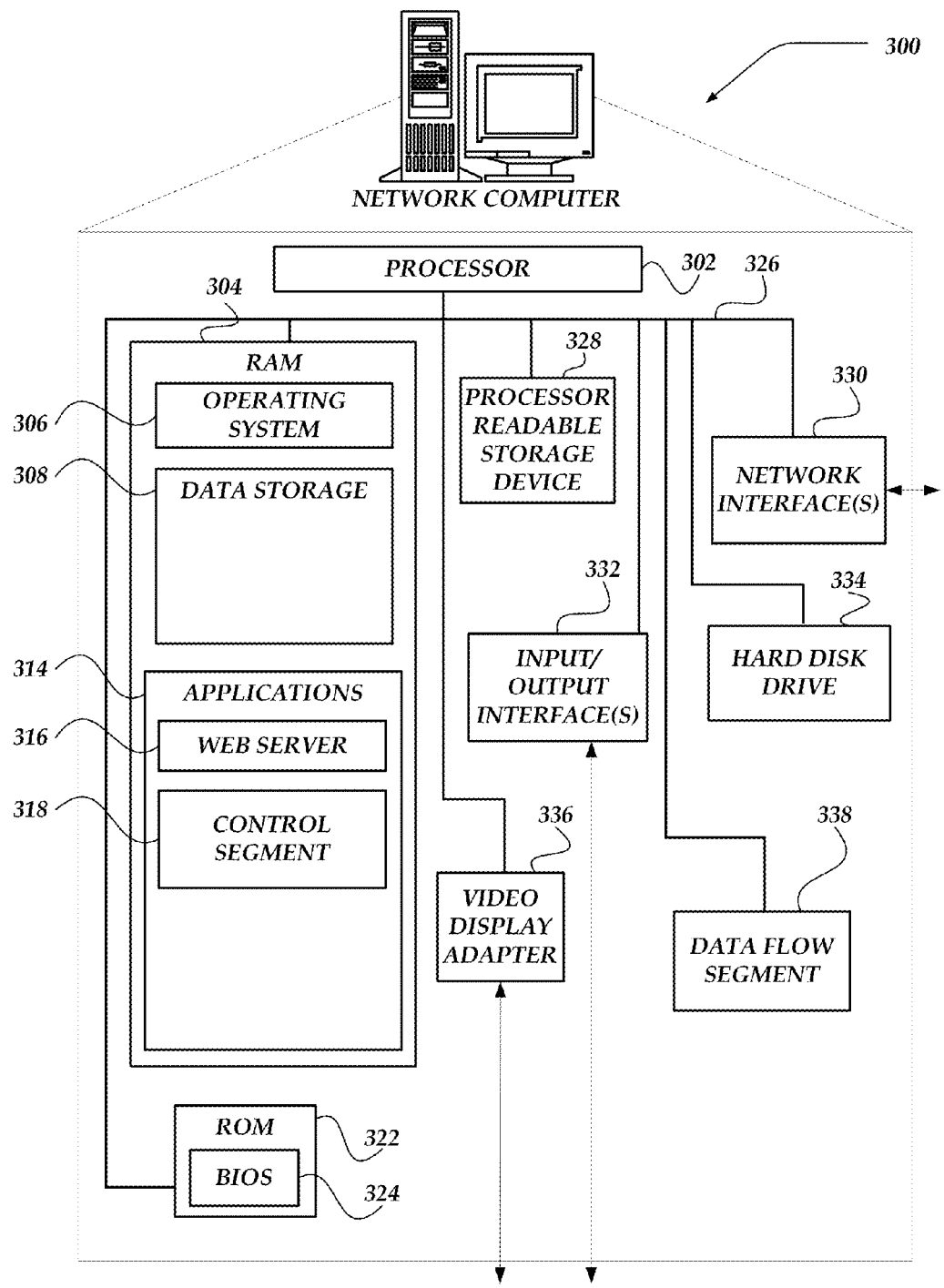
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, or any other computer. Network computer 300 may represent, for example PTMD 109 of FIG. 1, server computers 110-111 of FIG. 1, and/or other network computers.

Network computer 300 includes processor 302, processor readable storage device 328, network interface unit 330, an input/output interface 332, hard disk drive 334, video display adapter 336, data flow segment ("DFS") 338 and a mass memory, all in communication with each other via bus 326. The mass memory generally includes RAM 304, ROM 322 and one or more permanent mass storage devices, such as hard disk drive 334, solid state drive (SSD), tape drive, optical drive, and/or floppy disk drive. The mass memory stores operating system 306 for controlling the operation of network computer 300. Any general-purpose operating system may be employed. Basic input/output system ("BIOS") 324 is also provided for controlling the low-level operation of network computer 300. As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network computer 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer readable media, namely computer readable storage media and/or processor readable storage media, including processor readable storage device 328. Processor readable storage device 328 may include volatile, nonvolatile, non-transitory, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device and/or computer.

Data storage 308 may include a database, text, spreadsheet, folder, file, or the like, that may be configured to maintain and store user account identifiers, user profiles, email addresses, IM addresses, and/or other network addresses; or the like. Data stores 308 may further include a program code, data, algorithms, and the like, for use by a processor, such as central processing unit 302 to execute and perform actions. In one embodiment, at least some of data store 308 might also be stored on another component of network computer 300, including, but not limited to processor-readable storage device 328, hard disk drive 334, or the like.

The mass memory may also stores program code and data. One or more applications 314 may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 316 and control segment ("CS") 318 may also be included as application programs within applications 314.

Web server 316 represent any of a variety of services that are configured to provide content, including messages, over a network to another computing device and/or computer. Thus, web server 316 includes, for example, a web server, a File Transfer Protocol ("FTP") server, a database server, a content server, or the like. Web server 316 may provide the content including messages over the network using any of a variety of formats including, but not limited to WAP, HDML, WML, SGML, HTML, XML, Compact HTML ("cHTML"), Extensible HTML ("xHTML"), or the like. Web server 316 may also be configured to enable a user of a client computer, such as client computers 102-105 of FIG. 1, to browse websites, upload user data, or the like.

Network computer 300 may also include DFS 338 for maintaining connection flows between client computers, such as client computers 102-105 of FIG. 1, and server computers, such as server computers 110-111 of FIG. 1. In one embodiment, DFS 338 may include hardware-optimized operations for packet traffic management, such as repetitive operations associated with packet traffic management. For example, DFS 338 may perform statistics gathering, per-packet policy enforcement (e.g., packet address translations), or the like, on connection flows maintained at DFS 338. In some embodiments, DFS 338 may route, switch, forward, and/or otherwise direct packets based on rules for a particular connection flow signature (e.g., a 5 tuple of a received packet). Thus, DFS 338 may include capabilities and perform tasks such as that of a router, a switch, a routing switch, firewalls, network address translation, or the like. In some embodiments, the rules for a particular connection flow signature may be based on instructions received from CS 318. In one embodiment, DFS 338 may store the instructions received from CS 318 in a local memory as a table or some other data structure. In some other embodiments, DFS 338 may also store a flow state table to indicate a state of current connection flows maintained at DFS 338. In at least one of the various embodiments, components of DFS 338 may comprise and/or work in combination to provide high-speed flow caches for optimizing packet traffic management. In at least one of the various embodiments, CS 318 may provide connection updates to DFS 338 that may include activating or deactivating one or more protocol options for a particular connection flow, such as, turning on or off SYN-Cookie for TCP flows, or the like.

In some embodiments, DFS 338 may provide connection flow updates to CS 318. In one embodiment, a connection flow update may include a status of the connection flow, a current state of the connection flow, other statistical information regarding the connection flow, or the like. The connection flow update may also include an identifier that corresponds to the connection flow. The identifier may be generated and provided by CS 318 when a connection flow is established at DFS 338. In some embodiments, the connection flow update may be a connection flow delete update provided to CS 318 after the connection flow is terminated at DFS 338. The connection flow update and/or the connection flow delete update may be provided to CS 318 periodically, at predefined time intervals, or the like. In some embodiments, DFS 338 may stagger a time when a plurality of connection flow updates are provided to CS.

In some other embodiments, DFS 338 may include a plurality of data flow segments. In one non-limiting example, a first data flow segment within DFS 338 may forward packets received from a client computer to a server computer, while a second data flow segment within DFS 338 may forward and/or route packets received from a server computer to a client computer. In at least one of the various embodiments, DFS 338 may also be implemented in software.

CS 318 may include a control segment that may include software-optimized operations to perform high-level control functions and per-flow policy enforcement for packet traffic management. CS 318 may be configured to manage connection flows maintained at DFS 338. In one embodiments, CS 318 may provide instructions, such as, for example, a packet address translation instructions, to DFS 338 to enable DFS 338 to forward received packets to a server computer, such as server computer 110-111 of FIG. 1. In some other embodiments, CS 318 may forward and/or route packets between a client computer and a server computer independent of DFS 338.

In at least one of the various embodiments, CS 318 may include a plurality of control segments. In some embodiments, a plurality of control segments may access and/or manage connection flows at a single data flow segments and/or a plurality of data flow segments. In some other embodiments, CS 318 may include an internal data flow segment. In one such embodiment, the internal data flow segment of CS 318 may be distributed and/or separate from CS 318. For example, in one embodiment, CS 318 may be employed in software, while the internal data flow segment may be employed in hardware. In some other embodiments, CS 318 may identify if connection flows are split between different data flow segments and/or between a DFS 338 and CS 318. In at least one embodiment, CS 318 may also be implemented in hardware.

In at least one of the various embodiments, CS 318 may be configured to generate an identifier for each connection flow established at DFS 338. In some embodiments, CS 318 may utilize a sequence number of a SYN to generate an identifier for a corresponding connection flow.

In one embodiment, the identifier may be based on a hash of the sequence number. In another embodiment, the identifier may be based on an exclusive OR byte operation of the sequence number. CS 318 may cache the identifier at CS 318 and may provide the identifier to DFS 338. In some embodiments, CS 318 may cache an identifier for each connection flow it establishes at DFS 338.

In at least one of the various embodiments, CS 318 may be configured to detect packet flood attacks such as SYN flood attacks. In at least one of the various embodiments, if a flood attack may be detected the CS may provide flow control information, such as, flood attack mitigation options to the DFS in response to flood attacks. Further, in some embodiments, CS 318 may be arranged to detect other malicious network activity/attacks and selectively perform one or more attack mitigation procedures.

Illustrative Logical Architecture and Use Cases

Figure 4A:
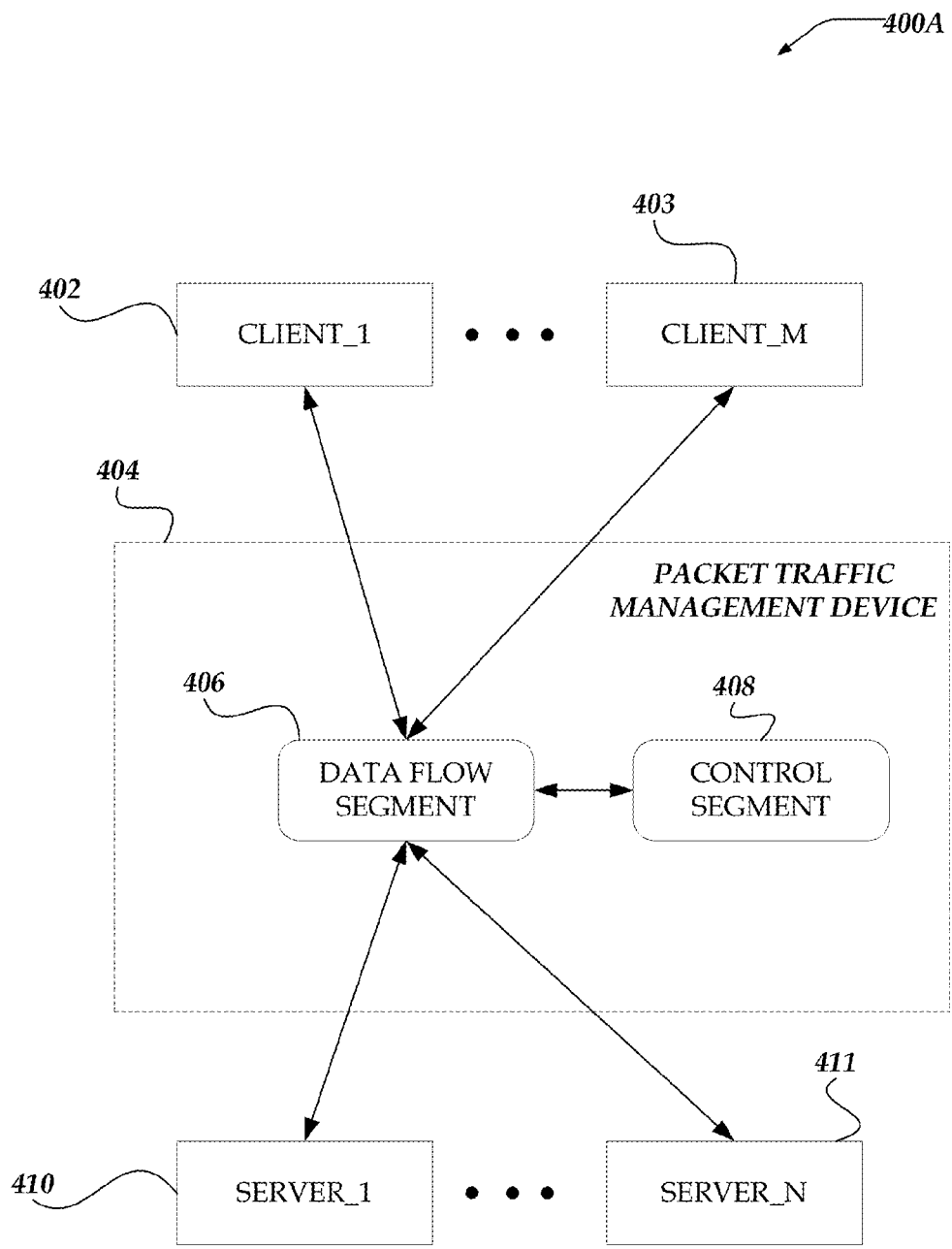
FIGS. 4A and 4B illustrate overview system diagrams generally showing embodiments of a packet traffic management computer disposed between client computers and server computers in accordance with the embodiments.

FIG. 4A illustrates a system diagram generally showing one embodiment of a system with a packet traffic management device disposed between client computers and server computers. System 400A may include packet traffic management device ("PTMD") 404 disposed between client computers 402-403 and server computers 410-411. Client computers 402-403 may include Client_1 through Client_M, which may include one or more client computers, such as client computers 200 of FIG. 2. Server computers 410-411 may include Server_1 through Server_N, which may represent one or more server computers, such as server computers 110-111 of FIG. 1.

In one embodiment, PTMD 404 may be an embodiment of PTMD 109 of FIG. 1. PTMD 404 may include data flow segment ("DFS") 406 in communication with control segment ("CS") 408. In at least one of the various embodiments, DFS 406 may be an embodiment of DFS 338 of FIG. 3, and CS 408 may be an embodiment of CS 318 of FIG. 3.

CS 408 may be configured to communicate with DFS 406, client computers 402-403 and/or server computers 410-411 independent of DFS 406, and/or any combination thereof. CS 408 may establish connection flows at DFS 406. In some embodiments, CS 408 may establish a connection flow at DFS 406 by providing instructions including flow control data to DFS 406 that enables DFS 406 to forward packets received at PTMD 404. In one embodiment, CS 408 may perform a load balancing operation to select a server computer of server computers 410-411 to receive packets sent from a client computer, such as client computer 402. In some other embodiments, CS 408 may generate and cache a connection flow identifier to be provided to DFS 406 when the connection flow is established.

DFS 406 may be configured to facilitate communications between client computers 402-403 and server computers 410-411. DFS 406 may process and forward packets received at PTMD 404 based on the instructions and flow control data received from CS 408. For example, in one embodiment, DFS 406 utilizes the instructions and/or flow control data to forward packets received from client computer 402 to server computer 410 and to forward packets received from server computer 410 to client computer 402. In some embodiments, DFS 406 may forward predetermined packets to CS 408, such as, but not limited to, new connection flow requests (e.g., associated with a SYN). In yet other embodiments, DFS 406 may notify CS 408 that a packet was received and forwarded. In one non-limiting, non-exhaustive example, DFS 406 may notify CS 408 that an ACK was received from client computer 402 and forwarded to server computer 410. In at least one of the various embodiments, DFS 406 may also provide connection flow updates and a corresponding connection flow identifier to CS 408. CS 408 may compare the corresponding connection flow identifier with the cached identifier to determine if the connection flow update is valid.

In at least one of the various embodiments, DFS 406 may send evict messages to CS 408 if connection flows are evicted from the DFS 406. In at least one of the various embodiments, DFS 406 may evict a connection flow if new flows arrive and the capacity of the DFS to handle new connection flow may be exceeded. In at least one of the various embodiments, evictions from DFS 406 may occur if the high speed flow cache for storing flow control data exhausts its ability to store the flow control data for new connection flows. In at least one of the various embodiments, evict messages sent from DFS 406 to CS 408 may contain enough information to fully identify the connection flow (e.g., endpoints, ports, sequence numbers, flow state, VLAN ID, or the like).

In at least one of the various embodiments, CS 408 may receive and route packets associated with evicted connection flows, thereby taking on some of the duties of DFS 406. In at least one of the various embodiments, some new connection flow may not be offloads to DFS 406 if CS 408 determines that the connection flows may be management on the CS or if the CS determines that more information may be required to determine if the connection flow should be offloaded to DFS 406.

Although PTMD 404 illustrates DFS 406 and CS 408 as two partitions within a single PTMD 404, the invention is not so limited. Rather, in some embodiments, DFS 406 and CS 408 may be functional blocks in a same PTMD 404 (i.e., a same chassis/computing device). In other embodiments, DFS 406 may be implemented by one or more chassis/computing devices separate from one or more other chassis/computing devices that may be utilized to implement CS 408. In yet other embodiments, CS 408 may be a module that plugs into DFS 406. Additionally, it is envisaged that the functionality of either DFS 406 and/or CS 408 may be separately implemented in software and/or hardware.

Figure 4B:
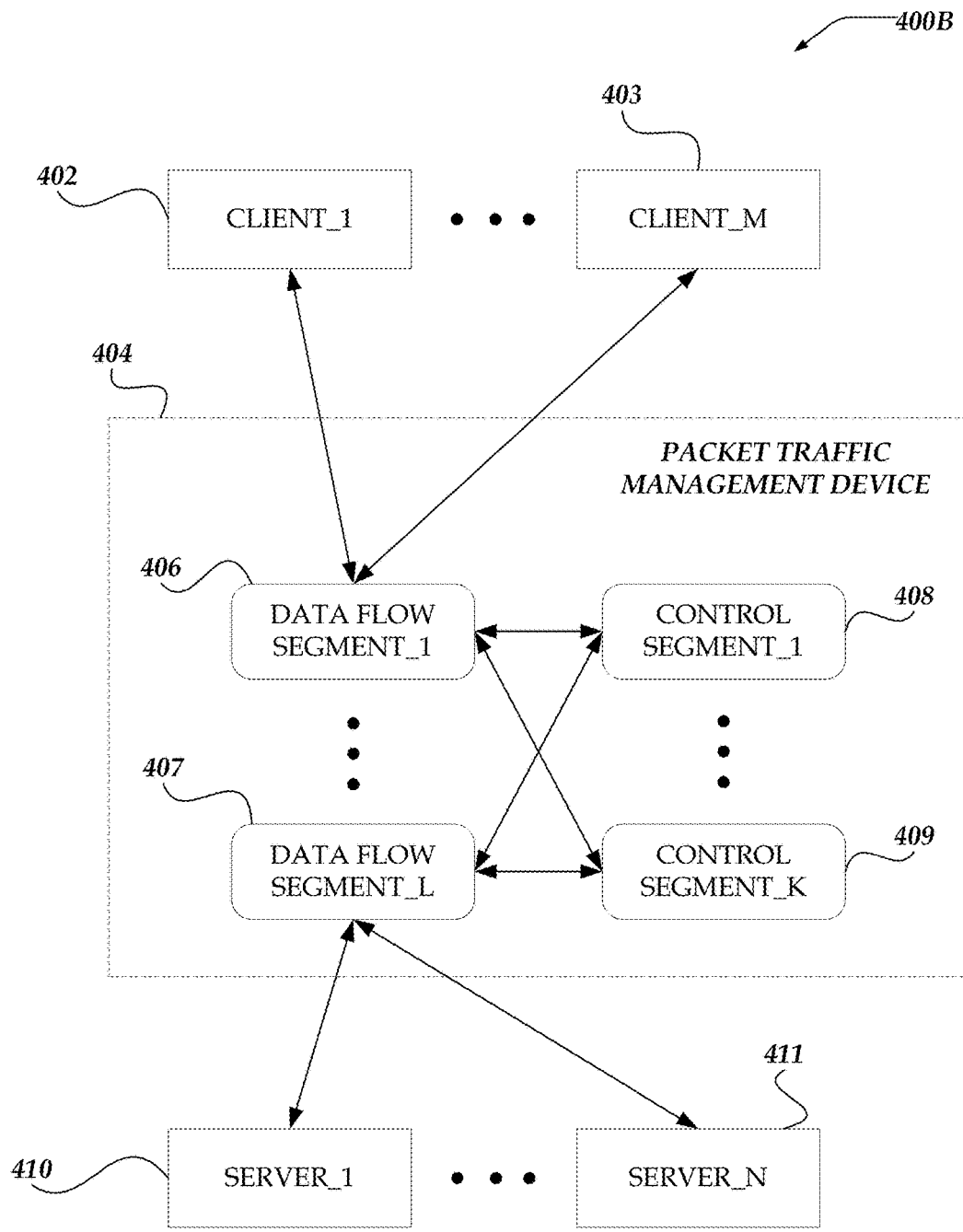

FIG. 4B illustrates a system diagram generally showing one embodiment of a system with a packet traffic management device disposed between client computers and server computers. System 400B may include packet traffic management device ("PTMD") 404 disposed between client computers 402-403 and server computers 410-411. Client computers 402-403 may include Client_1 through Client_M, which may include one or more client computers, such as client computers 102-105 of FIG. 1. Server computers 410-411 may include Server_1 through Server_N, which may include one or more server computers, such as server computers 110-111 of FIG. 1.

In one embodiment, PTMD 404 may be an embodiment of PTMD 404 of FIG. 4. PTMD 404 may include data flow segments ("DFS") 406-407 and control segments ("CS") 408-409. DFS 406-407 may include a plurality of data flow segments, each of which may be an embodiment of DFS 406 of FIG. 4A. CS 408-409 may include a plurality of control flow segments, each of which may be an embodiment of CS 408 of FIG. 4.

In some embodiments, data communicated between client computers 402-403 and server computers 410-411 may flow through one or more data flow segments 406-407. In one embodiment, data from client computers 402-403 may flow through a first DFS, such as DFS 406 and data from server computers 410-411 may flow through a second DFS, such as DFS 407.

In at least one of the various embodiments, one or more data flow segments of DFS 406-407 may communicate with one or more control segments of CS 408-409. Similarly, one or more control segments of CS 408-409 may communicate with one or more data flow segments of DFS 406-407. In some embodiments, each control segment of CS 408-409 may communicate (not shown) with other control segments of CS 408-409. In other embodiments, each data flow segment of DFS 406-407 may communicate (not shown) with other data flow segments of DFS 406-407.

Also, in at least one of the various embodiments, connection flows may be split into flow portions based on the direction of network packet travel. In at least one of the various embodiments, the network packets coming from the client may treated as a separate connection flow and the network packets coming from a server and directed towards a client may be treated as a separate connection flow. In at least one of the various embodiments, this enables optimizations based on the amount of network packet traffic of a particular split connection flows. In at least one of the various embodiments, this may enable the upload and download direction portion of connection flows to be split across CS 408-409 and DFS 406-407 based on the characteristics of the upload and download portions of the connection flows. For example, in at least one of the various embodiments, if downloading streaming video may be a very asymmetric operation having many network packets download to the client and few uploaded. In at least one of the various embodiments, the upload and download portions of connection flow in the download direction may be optimized independently with one portion using the DFS and a high-speed flow cache and the other portion may be handled on the CS using lower performing (e.g., less expensive) resources.

In at least one of the various embodiments, PTMD's may be arranged such that various tasks, such as, flood attack detection, performance monitoring, metric aggregation, flood attack mitigation procedures, or the like, or combination thereof, may be performed simultaneously on one or more CSs and/or one or more DFSs that are included in a PTMD. For example, in at least one of the various embodiments, tasks such as, SYN-Cookie protection, continuous flood monitoring, or the like, may be managed and/or executed by one or more particular CSs and/or DFSs.

In some embodiments, the different tasks may be distributed to one or more particular CSs or DFSs based on configuration information and/or rule based policies. Further, in at least one of the various embodiments, the tasks may be distributed based in part on the performance load of the CSs and/or the DFSs. For example, in at least one of the various embodiments, a PTMD may be configured such that some or all CSs may be dedicated to one or more flood attack detection procedures. Likewise, in some embodiments, some or all CSs may be dedicated to performing one or more flood attack mitigation procedures. In some embodiments, the distribution of flood attack detection and mitigation procedures to one or more CSs and/or DFSs may occur even if a single network destination is under attack. For example, more than one CSs may be activated to monitor flow connections directed to the same network destination.

Also, in at least one of the various embodiments, a PTMD may be configured to offload one or more network flows that are determined to require flood attack mitigation to one or more DFSs. In at least one of the various embodiments, DFSs may be arranged to perform hardware accelerated flood mitigation procedures (e.g., SYN-Cookie handling) as directed by a CS.

In some embodiments, DFSs may perform flood attack detection/monitoring and flood attack mitigation on network flows that are located in their high speed flow caches. Accordingly, in at least one of the various embodiments, flood attack protection and flood attack mitigation procedures performed on the DFSs may have improved performance. Likewise, in at least one of the various embodiments, performing flood attack protection and flood attack mitigation procedures on one or more DFSs may reduce performance impacts to untargeted network destinations, services, connection, networks, or the like, that may be simultaneously managed by the PTMD.

Figure 5:
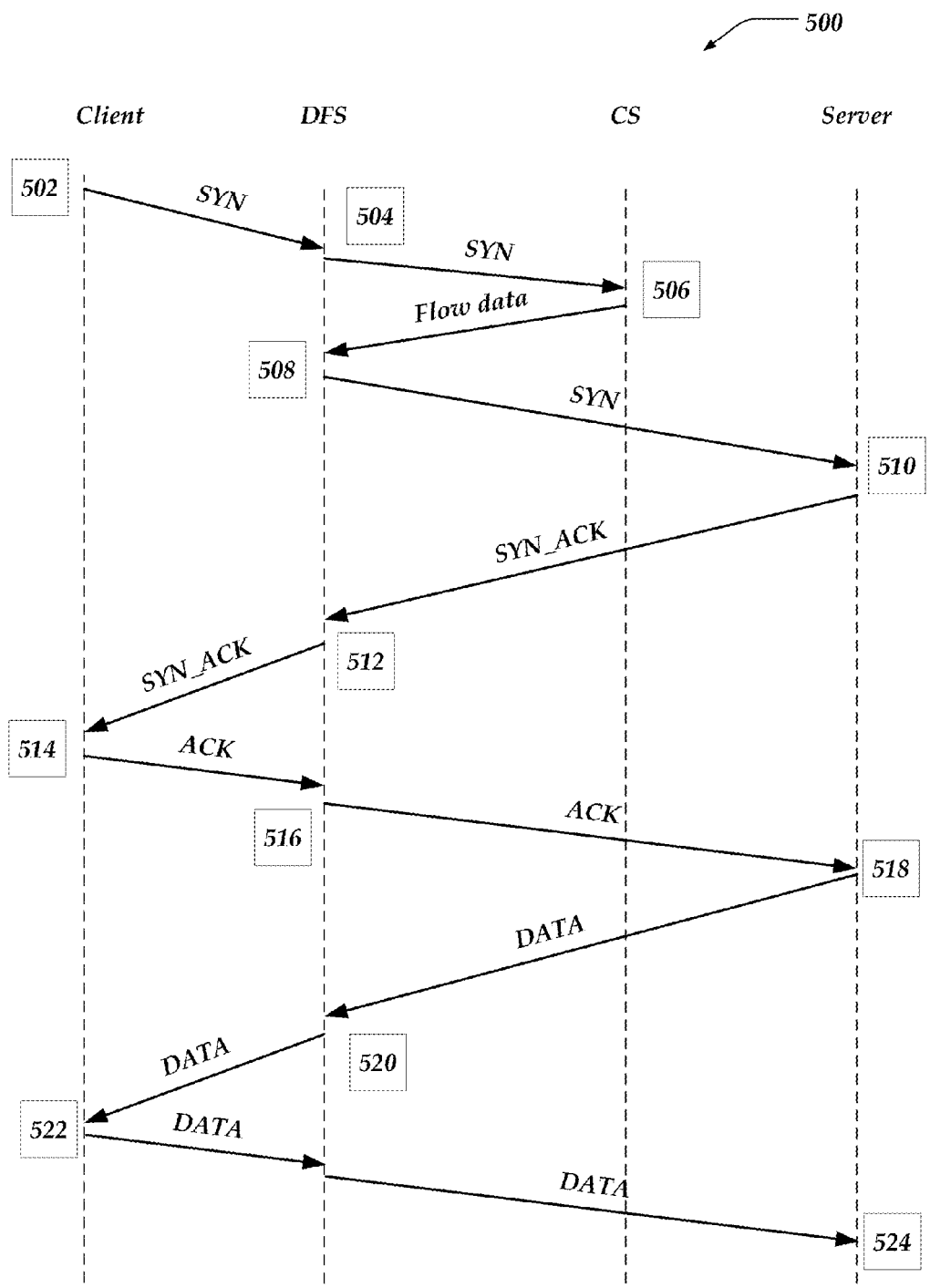
FIG. 5 illustrates a sequence diagram generally showing one embodiment of a sequence for establishing a connection in accordance with the embodiments.

FIG. 5 illustrates an embodiment of a sequence for establishing a connection flow and offloading the new connection flow to the data flow segment (DFS). Sequence 500 may show an embodiment using TCP/IP networking protocol but one of ordinary skill the art will appreciate that the sequence diagram (or similar sequences) may generally apply to other networking protocols that may have other handshaking sequences as well. Also, even though sequence 500 depicts a sequence including one client, one DFS, one CS, and one application server, in at least one of the various embodiments, one or more, data flow segments, control segments, clients, and servers, may be participate in handshaking and in the connection flow offloading. Also, in at least one of the various embodiments, the connection flows may be split into upload and download portions of a connection flow, with each portion representing one direction of the connection flow.

In at least one of the various embodiments, sequence 500 begins at step 502 if a client initiates a connection with a network resource that may be managed by a PTMD, such as PTMD 109. If client may be initiating the connection using TCP/IP, a SYN packet may be sent to the PTMD.

At step 504 a SYN packet may be received at a DFS that may be part of a PTMD. In at least one of the various embodiments, at step 506, because the DFS may determine that the incoming connection represents a new connection flow, the DFS may forward the SYN packet to a CS. At step 506 a CS may examine the connection flow and may determine the appropriate flow control data for the new flow and send it to the DFS. In at least one of the various embodiments, CS may apply one or more stored rules that may be used to determine the flow control data for the new network connection flow. In at least one of the various embodiments, the stored rules may implement network traffic management services such as load balancing, application access control, malicious attack mitigation, or the like.

In at least one of the various embodiments, at step 508 the DFS may receive the flow control data from the CS and store it in a high speed flow cache. In at least one of the various embodiments, the flow control data may be used by the DFS to forward the SYN packet to an appropriate server and/or network resource as directed by the flow control data that may be provided by the CS.

In at least one of the various embodiments, at step 510 a server and/or network resource may receive the SYN packet and may respond by sending a SYN_ACK packet to the DFS. In at least one of the various embodiments, at step 512 the DFS may again use the flow control data stored in the high speed flow cache to map and/or translate the SYN_ACK from a server to the appropriate client.

In at least one of the various embodiments, at step 514 the client computer that sent the initial SYN packet may receive the corresponding SYN_ACK and subsequently may respond with an ACK packet. In at least one of the various embodiments, at step 516 the DFS, using the stored flow control data to determine the network path to server, may forward the ACK packet to the server.

In at least one of the various embodiments, at step 518 the server may receive the ACK packet corresponding to the client computer. After the ACK may have been received, the network connection flow may be in an established state. In at least one of the various embodiments, during steps 520-524, using the established network connection flow, the server may begin exchanging application data with client. In at least one of the various embodiments, at this point, for each exchange of data, the DFS may use the flow control data that may be stored in the high speed flow cache to map between the application servers and the client to route the packets on the correct path to maintain the connection flow.

In at least one of the various embodiments, a malicious host participating in a SYN flood attack may cause steps 502-514 of the sequence to be executed. However, during a typical SYN flood attack the outbound SYN_ACK (step 512-514) may be ignored by the malicious host. This may lead to increased resource consumption on the PTMD and the Server.

Figure 6A:
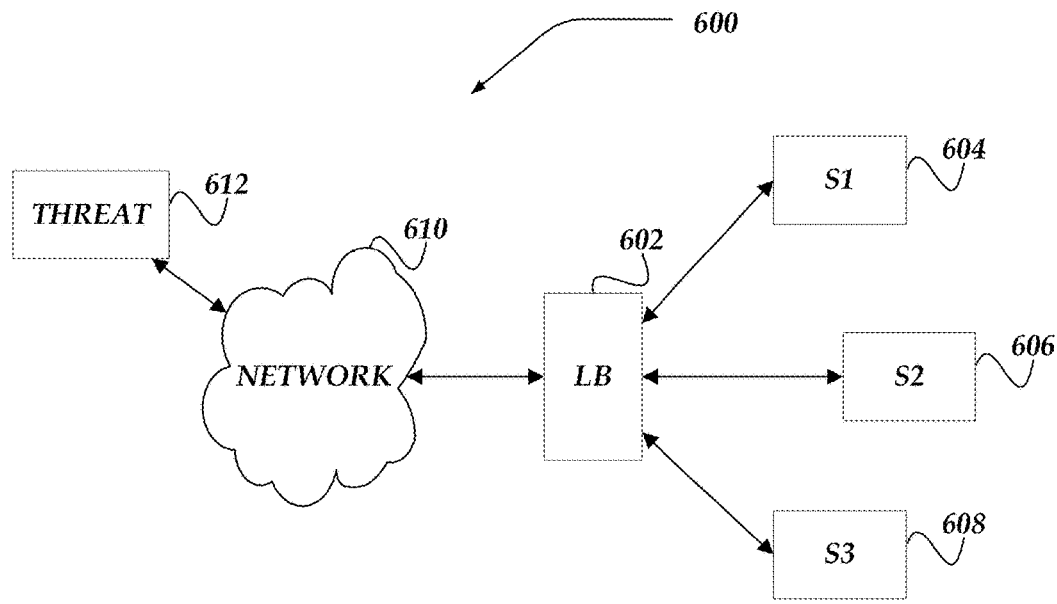
FIGS. 6A and 6B show a load balancer system and a firewall system arranged in accordance with at least one of the various embodiments.
Figure 6B:
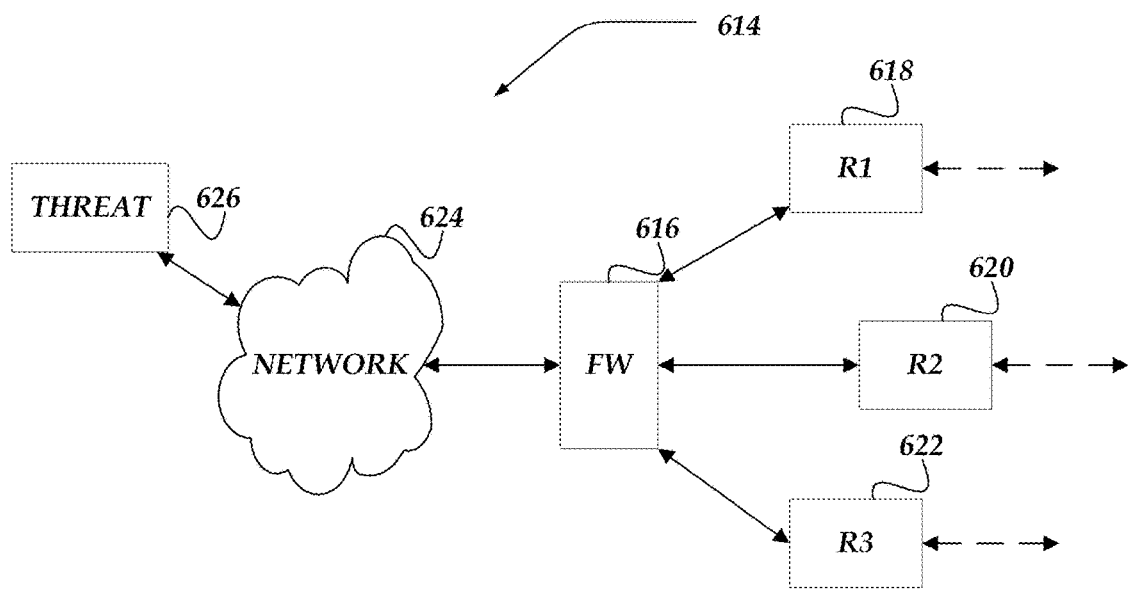

FIGS. 6A and 6B show two systems arranged in accordance with at least one of the various embodiments. FIG. 6A shows system 600 where a PTMD may be operative as a load balancer. Load balancer 602 may be arranged to distribute network traffic to one or more network computers, such as, server computer 604, server computer 606, server computer 608, or the like. Network traffic to and from load balancer 602 may be communicated over network 610. In at least one of the various embodiments, network 610 may be one or more networks substantially similar to wireless network 107, network 108, or a combination thereof. See, FIG. 1.

In at least one of the various embodiments, threats from one or more computers, such as threat computer 612 may generate malicious network traffic communication over network 610 that may be directed at one or more of load balancer 602, server computer 604, server computer 606, server computer 608, or a combination thereof.

In some cases, in at least one of the various embodiments, load balancer 602 may be configured to forward network traffic to a particular server or group of servers based on one or more rules based policies. In some embodiments, traffic may be routed to servers that may be performing specialized tasks or that may contain certain types of content. For example, if system 600 represents an e-commerce web application, server 604 may be arranged to host dynamic html for presenting a web store to requesting client; server 606 may be arranged to handle and process credit card payments; and server 608 may be arranged to provide static content, such as, images, style sheets, static HTML, or the like. In this example, the different servers may have different performance profiles and/or operational loads profiles.

FIG. 6B shows system 614 where a PTMD may be operative as a network firewall. In at least one of the various embodiments, firewall 616 may be arranged to provide edge-of-network firewall services to one or more network computers, or in this example, to one or more gateways or routers, such as, router 618, router 620, router 622, or the like. Network traffic to and from firewall 616 may be communicated over network 624. In at least one of the various embodiments, network 624 may be one or more networks substantially similar to wireless network 107, network 108, or a combination thereof. See, FIG. 1.

In this example, each router in this example may be arranged to route network communication to other servers in networks or sub-networks that may be "behind" the each router. For example, router 618 may be a gateway for one department of a company, while router 620 and router 622 may be gateways for other departments.

In at least one of the various embodiments, threats from one or more computers, such as threat computer 622 may generate malicious network traffic communication over network 624 that may be directed at one or more of firewall 616, router 618, router 620, router 622, or a combination thereof.

In at least one of the various embodiments, metrics related to the network traffic managed by PTMD 602 and PTMD 616 may be captured. In at least one of the various embodiments, metrics may comprise information that may be used to determine if a flood attack may be directed at one or more computers behind the PTMD, such as, in this example, server computers 604-608 and routers 618-622, or the like. For example, a PTMD may maintain a count of the number of incomplete connections over a given time window. In other embodiments, the PTMD may be arranged to monitor and accumulate metric information for a group of network address and/or a group of servers. For example, PTMD 616 may be configured to maintain separate metric information for each of router 618, router 620, and router 622. In at least one of the various embodiments, one of the metrics associated with flood attacks may include a ratio of incoming SYN packets to the number of SYN_ACK packet errors, such as, unanswered outbound SYN_ACK packets or answered outbound SYN_ACK packets answered using incorrect signatures that occur within a defined time window.

In at least one of the various embodiments, a PTMD may be arranged to group metric information based on hashing the destination network addresses into buckets that are based on a hash key corresponding to each network address value. In these embodiments, a fixed-length hash key may be generated for each determined destination address. The value of the hash key may correspond to a bucket in a hash table where the metric information may be stored.

For example, in at least one of the various embodiments, if a PTMD is arranged to use a four-bit hash key, there will be sixteen hash buckets in the hash table for storing metric information. Likewise, if a sixteen-bit hash key is used their may be up to 65536 buckets in the hash table. Accordingly, in at least one of the various embodiments, the correct hash table entry for storing metric information corresponding to a particular network address may be determined by employing one or more well-known hashing functions to the network address. Likewise, in at least one of the various embodiments, other probabilistic grouping/filtering methods, including, bloom filters may be employed for aggregating metric information.

Accordingly, in at least one of the various embodiments, depending on how the PTMD may be configured, metric information may be computed/accumulated in various ways, such as, per individual network address, network destination, per network address groups (e.g., hash bucket aggregation), per virtual network address (e.g., per VIPs), per network sub-nets, or the like. Likewise, in at least one of the various embodiments, one or more threshold values corresponding to the metrics may be defined. In at least one of the various embodiments, thresholds may be defined globally, per network address, per network destination, per network address group, per virtual network address, per network application, or the like.

In at least one of the various embodiments, the PTMD may be configured to associate downstream network destinations into one or more groups. For example, rather being an individual server, server 604, server 606, and server 608 may represent multiple network destinations or network addresses. Likewise, router 618, router 620*m*, and router 622 may represent multiple router and/or gateways. In any event, a PTMD may be arranged to track network communication metrics for each group. In at least one of the various embodiments, if group level metrics exceed one or more threshold that indicate a flood attack the PTMD may be arranged to actions to mitigate the impact of the attack.

In at least one of the various embodiments, in response to a flood attack the PTMD may activate flood attack mitigation procedures for the entire group (e.g., for each network address that may be associated with a group that may be under attack). However, to avoid negatively impacting those network addresses in the group that may not be targets of the flood attack, the PTMD may be arranged to perform additional actions.

In at least one of the various embodiments, these additional actions may include determining which network addresses associated with the group may be under attack. Some embodiments may capture network address information from incoming network packets. This information may be used by the PTMD to activate one or more flood attack mitigation procedures for a particular network destination associated with the group. For example, if the a SYN flood attack is targeting one or more network destinations associated with a group, capturing information from an incoming SYN packet may be used to identify a likely target of the ongoing attack. Accordingly, the PTMD may activate a flood attack mitigation procedure such as SYN Cookie to protect the one identified network destination independently and/or separate from the other network destinations associated with the group.

In at least one of the various embodiments, the PTMD may continue to monitor one or more individual network destination and/or group metrics to determine if the flood attack has been mitigated sufficiently. If the group metrics indicate that the group may still be undergoing a flood attack, there may be multiple (and as yet unaddressed) flood attacks directed at other network destinations associated with the group. Or, it may be that the network destination designated for flood attack mitigation was not actually the destination that is under attack. In any event, if the group remains under attack, the PTMD may be arranged to capture network address information from another packet and active flood mitigation for the subsequently determined network destination.

In at least one of the various embodiments, the PTMD may be arranged to activate one or more group level flood mitigation procedures while the group metrics indicate that the group may under flood attack. For example, such flood mitigation procedures may include, reducing the cache priority for connections associated with the group, traffic priority demotion for network traffic for each network destination that may be associated with the group, or the like, combination thereof.

In at least one of the various embodiments, as each network destination under attack is determined and protected, the group metrics may returns to levels that enable the PTMD to deactivate group level flood mitigation procedures. Likewise, in at least one of the various embodiments, the PTMD may monitor one or more metrics for each network destination that may be under attack. Accordingly, in at least one of the various embodiments, as the metrics return to normal (falling below a defined threshold that may be indicative of a flood attack) the PTMD may deactivate flood attack mitigation procedures for the network destination.

Accordingly, in at least one of the various embodiments, the PTMD may be arranged to simultaneously monitor group metrics and the metrics for each network destination determined to be under attack.

In at least one of the various embodiments, in addition to employing the network destination information, the PTMD may be arranged to employ network address information that may be associated with the source of the flood attack for narrowing down which network flows should have flood attack mitigation activated. In at least one of the various embodiments, metrics associated with the source of the attacks may be aggregated, grouped and/or hashed as described above for network destinations.

In at least one of the various embodiments, the PTMD may be arranged to detect other malicious activity and/or network attacks in addition to flood attacks. Accordingly, in at least one of the various embodiments, denial of service attack mitigation procedures, such as, rate limiting, traffic priority demotion, or the like, or combination thereof, may also be enabled for network flows that may be associated with network destinations that may be determined to be targeted by these other attacks. The mitigation procedures for these different types of attacks, may be activated on a per network destination as per the flood attack mitigation procedures.

Generalized Operation

The operation of certain aspects of the invention will now be described with respect to FIGS. 7-10. In at least one of various embodiments, processes 700, 800, 900, and 1000 described in conjunction with FIGS. 7-10, respectively, may be implemented by and/or executed on a network computer, such as network computer 300 of FIG. 3. In other embodiments, these processes or portions of these processes may be implemented by and/or executed on a plurality of network computers, such as network computer 300 of FIG. 3. Further, in other embodiments, these processes or portions of these processes may be implemented by and/or executed on one or more client computers, such as client computer 200 as shown in FIG. 2. However, embodiments are not so limited and various combinations of network computers, or the like, may be utilized.

Figure 7:
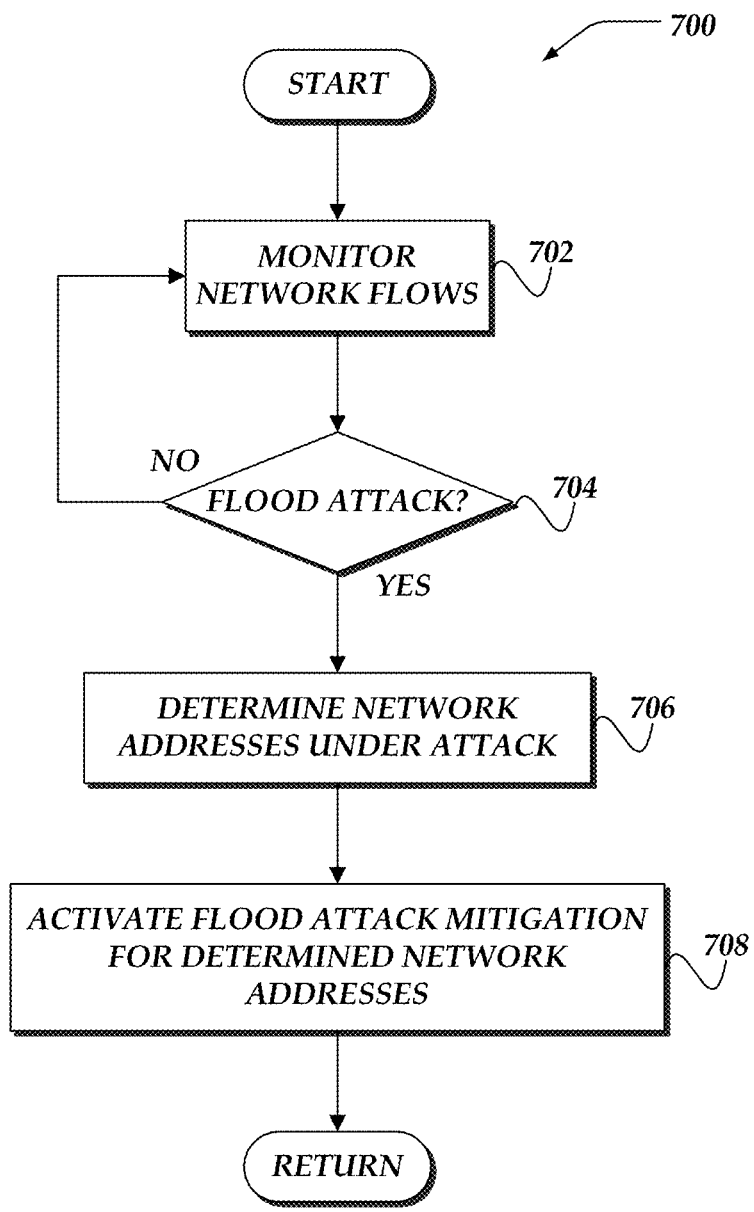
FIG. 7 shows an overview flowchart for a process for flood protection for network addresses that may be under attack, in accordance with at least one of the various embodiments.

FIG. 7 shows an overview flowchart for process 700 for flood protection for network addresses that may be under attack, in accordance with at least one of the various embodiments. After a start block, at block 702, one or more network flows may be monitored by a PTMD. In at least one of the various embodiments, the PTMD may be arranged and/or configured to operate in various network configurations and/or management roles, such as, but not limited to those described in conjunction with FIGS. 6A and 6B. In at least one of the various embodiments, as described above, the PTMD may be generating one or more metrics related to the operation and/or performance characteristics of the monitored network flows.

In at least one of the various embodiments, metrics may be configured to capture metrics relative to various contexts and/or scopes, such as, globally (for the entire PTMD), per network address groups, per virtual network address (e.g., VIPs), per network flow, per network applications, or the like.

At decision block 704, in at least one of the various embodiments, if a flood attack is detected on one or more network flows, control may move to block 706; otherwise, control may loop back to block 702.

In at least one of the various embodiments, one type of flood attack is a SYN flood attack. Generally, SYN flood attacks may be characterized as malicious activity where the attacker initiates a TCP handshake but does not respond to subsequent acknowledgement messages sent by the targeted endpoint computer. In at least one of the various embodiments, the PTMD may be arranged to determine if a SYN flood attack may be occurring if the number of partial (e.g., half-open or incomplete) connections exceed a defined threshold for a given time window. Likewise, other methods may be employed to detect flood attacks, such as, detecting if the flow of data packets has dropped below a threshold for a given time window. One of ordinary skill in the art will appreciate that a PTMD may implement several measurements, metrics, and thresholds for determining if a flood attack may be ongoing. For these innovations, any method of detecting a flood attack is envisaged and is therefore is within the scope of these innovations.

At block 706, in at least one of the various embodiments, the one or more network addresses (e.g., network destinations) that may be under attack by a flood attack may be determined by the PTMD. In at least one of the various embodiments, the PTMD may determine the network addresses that may be under attack in a variety of ways, including examining network packets that may be part of the attack. Or, in at least one of the various embodiments, the network address under attack may be derived based on the particular metric threshold that may have been exceeded. For example, in at least one of the various embodiments, if metrics are captured for a particular set/group of network addresses, exceeding one these metric thresholds may identify which network addresses may be under attack.

At block 708, in at least one of the various embodiments, flood attack mitigation procedures for the network addresses determined to be under attack may be activated. In at least one of the various embodiments, depending on the network protocols being employed, one or more procedures for mitigating the flood attack may be activated. For example, in some embodiments, if the flood attacks may be directed at TCP network addresses, the TCP feature SYN Cookie may be activated for those network addresses.

In at least one of the various embodiments, the CS components of a PTMD may be arranged to determine the network flows that may be under flood attack. Accordingly, in at least one of the various embodiments, the CS may provide control flow status messages to the DFS for the network addresses that may be under attack. In at least one of the various embodiments, the DFS may update a flow and/or connection list indicating that flood attack mitigation procedures should be enabled for the network flows indicated by the CS.

In at least one of the various embodiments, a PTMD may be arranged to have more than one CSs that may simultaneously monitor some or all of the network flows. Likewise, a PTMD may be arranged to include more than one DFS that may simultaneously monitor performance metrics and/or perform flood attack mitigation procedures.

Next, control may be returned to a calling process; or if monitoring is to continue, control may loop back to block 702.

Figure 8:
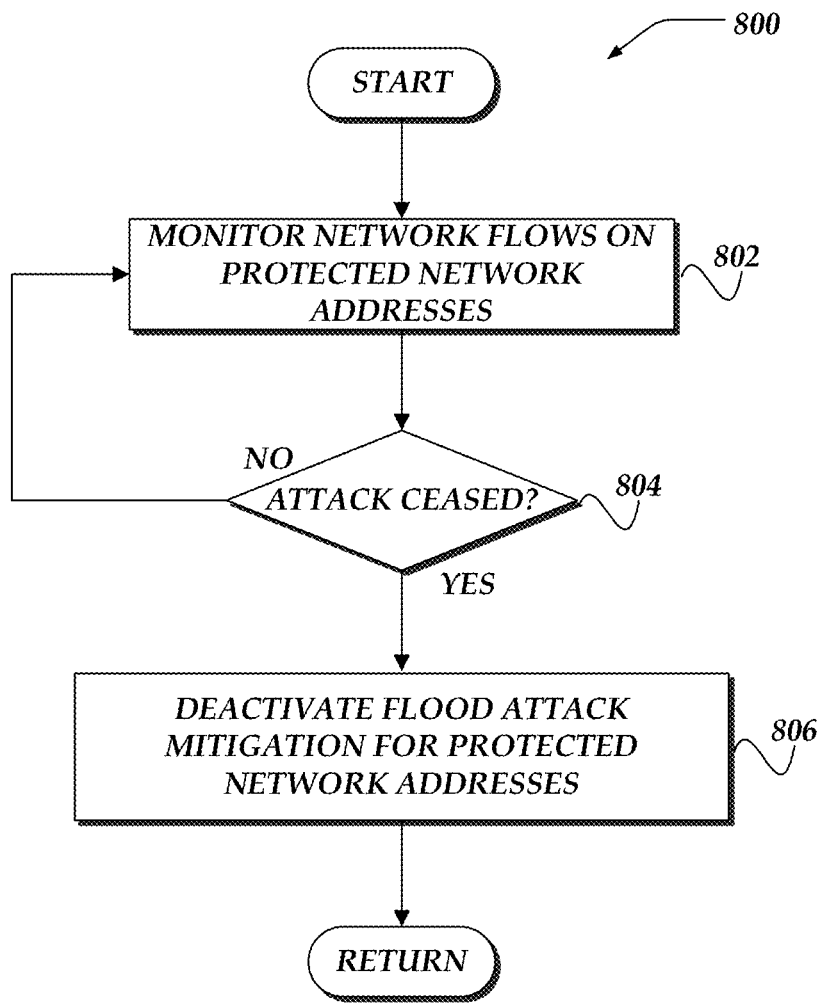
FIG. 8 shows an overview flowchart for a process for determining if flood protection should be deactivated for protected network flows, in accordance with at least one of the various embodiments.

FIG. 8 shows an overview flowchart for process 800 for determining if flood attack mitigation should be deactivated for protected network flows, in accordance with at least one of the various embodiments. After a start block, at block 802, network flows for one or more protected network addresses may be monitored. In at least one of the various embodiments, the PTMD may be monitoring traffic associated with one or more network flows that have been configured to employ flood attack mitigation procedures.

In at least one of the various embodiments, the PTMD may be generating one or more metrics that may be related to determining if the protected network flows remain under flood attack. In some embodiments, metrics and thresholds similar to those described for decision block 704 may be employed here.

At decision block 804, in at least one of the various embodiments, if one or more of the flood attacks have ceased, control may flow to block 806; otherwise, control may loop back to block 802 for continued monitoring. Based on the monitoring performed in block 802, the PTMD may determine that one or more of the protected network flows are no longer the target of a flood attack.

At block 806, in at least one of the various embodiments, flood attack mitigation may be removed for network flows and/or network addresses that may be determined to be no longer under attack. Accordingly, in at least one of the various embodiments, flood attack mitigation procedures, such as, network protocol features (e.g., SYN-Cookie) that may have been enabled to mitigate the attack(s) may be deactivated for network addresses determined to be free from attack.

In at least one of the various embodiments, one or more CS components of a PTMD may be arranged to provide a status update message to the DFS indicating that flood protection should be deactivated for the network flows determined to be free from attack. Accordingly, in at least one of the various embodiments, the DFS may be arranged to deactivate flood attack protections for the particular network addresses indicated by the CSs. For example, if the network addresses in question are using TCP, the DFS may deactivate the SYN-Cookie feature for those network addresses. Next, in at least one of the various embodiments, control may be returned to a calling process.

Figure 9:
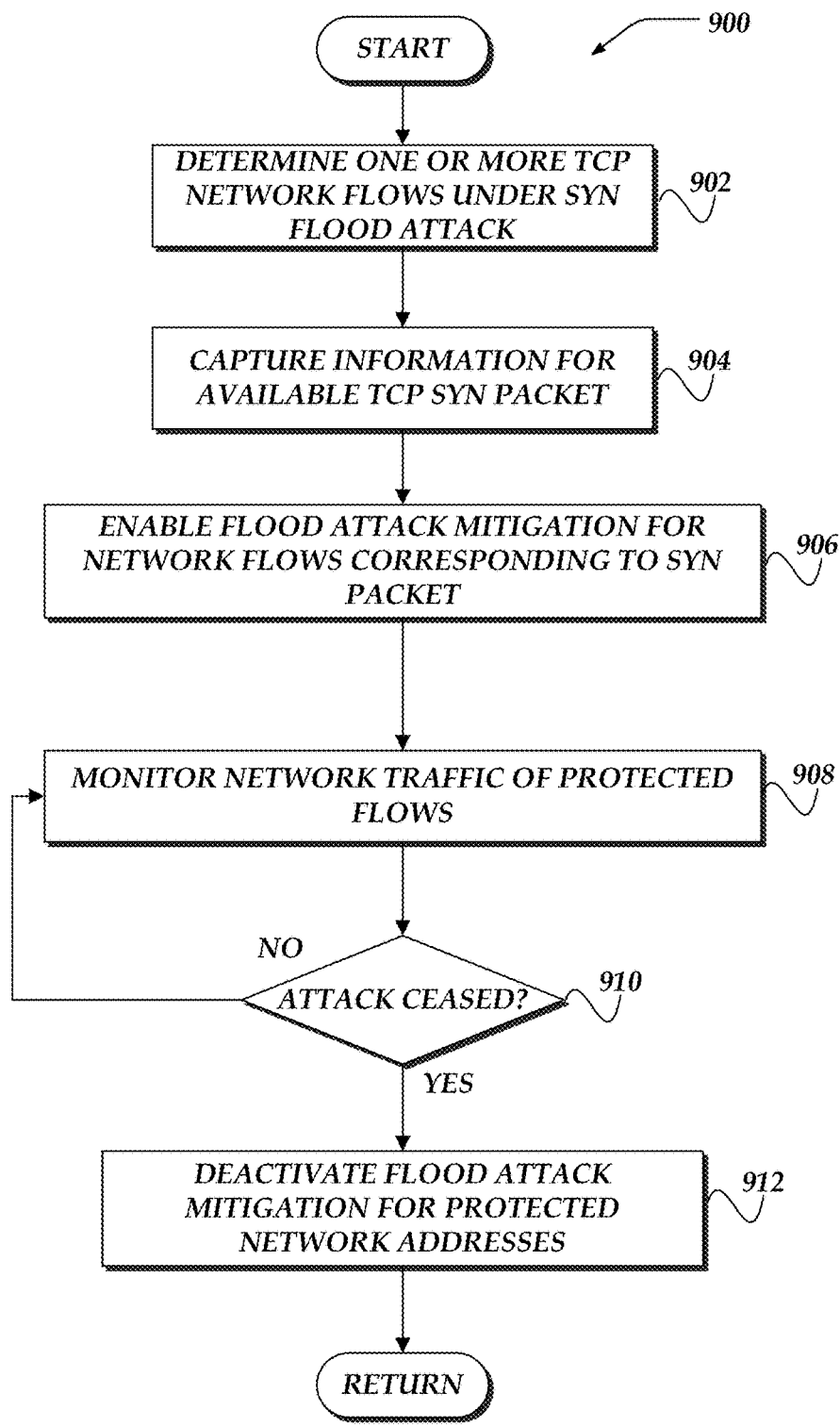
FIG. 9 shows a flowchart for a process for determining one or more network addresses that may be under SYN flood attack, in accordance with at least one of the various embodiments.

FIG. 9 shows a flowchart for process 900 for determining one or more network addresses that may be under SYN flood attack, in accordance with at least one of the various embodiments. After a start block, at block 902, in at least one of the various embodiments, the PTMD may determine that one or more network addresses may be the target of a SYN flood attack.

In at least one of the various embodiments, the PTMD may determine if a group of network destinations may be targeted by a flood attack. For example, the PTMD may be arranged to capture and/or generate metrics for a group of network addresses, rather than just a single network address within the group. In these embodiments, the group metrics may enable the PTMD to determine if a flood attack may be directed to one or more network destinations or addresses within the group.

At block 904, in at least one of the various embodiments, the PTMD may capture information of a readily available SYN packet. In at least one of the various embodiments, the SYN packet may include information such as the destination address and port. This information may be employed by the PTMD to determine the network destination (e.g., which server computer) that may be under attack.

In at least one of the various embodiments, if a SYN flood attack is occurring, the majority of SYN packets received at the PTMD are likely to be packets associated with the SYN flood attack target. Thus, in at least one of the various embodiments, rather than programmatically determining which server computer may be under attack, the PTMD may extract the target information from the next available SYN packet. For example, in some embodiments, a flood attack may cause 100 times more SYN packets than normal. Accordingly, in this example, if the PTMD selects the first available SYN packet, it is more likely than not to have be sent by an attacker. Thus, it is likely to include network information (e.g., tuple information) that may be employed in flood attack mitigation procedures.

Accordingly, in at least one of the various embodiments, if the flood attack is detected using global or group metrics, the particular network address within the group of possible specific targets of the attack may be identified from the SYN packet information. At block 906, in at least one of the various embodiments, flood attack mitigation procedures may be enabled for the network flows, network addresses, or network destinations that correspond to the information in the SYN packet. In at least one of the various embodiments, one or more CS components may provide a control status message to the DFS to activate TCP SYN-Cookie features for the one or more network flows corresponding to the information captured from the SYN packet.

In at least one of the various embodiments, the control status message may include a network flow identifier that may be generated using the destination address, destination port, one or more OSI L3 interface identifiers, or the like. In at least one of the various embodiments, OSI L3/L2interface identifiers may include identifiers such as, VLAN IDs, tunnel identifiers (e.g., IPSEC), link aggregation group (LAG) identifiers, physical network interface ID's, or the like.

At block 908, in at least one of the various embodiments, the PTMD may continue to monitor the protected network flows. In at least one of the various embodiments, as discussed above the PTMD may monitor the one or more protected network flows associated with the protected network addresses. See, FIG. 8.

At decision block 910, in at least one of the various embodiments, if the SYN flood attack on the protected flows has ceased, control may flow to block 912; otherwise, control may loop back to block 908. In at least one of the various embodiments, the PTMD may record and measure one or metrics for determining if a SYN flood attack has ceased.

At block 912, in at least one of the various embodiments, since one or more of the flood attacks has been determined to have ceased, flood attack mitigation procedures for the corresponding protected network flows and/or network addresses may be deactivated. For example, in at least one of the various embodiments, the PTMD may be arranged such that one or more CS components may provide a control status message to the DFS that SYN-Cookie should be deactivated for the network flows and/or network addresses that may be determined to be operating normally.

In at least one of the various embodiments, if the SYN packet information captured at block 904 is unrelated to a SYN flood attack, PTMD may be arranged to restore the mischaracterized network flows back to normal operations. Next, in at least one of the various embodiments, control may be returned to a calling process.

Figure 10:
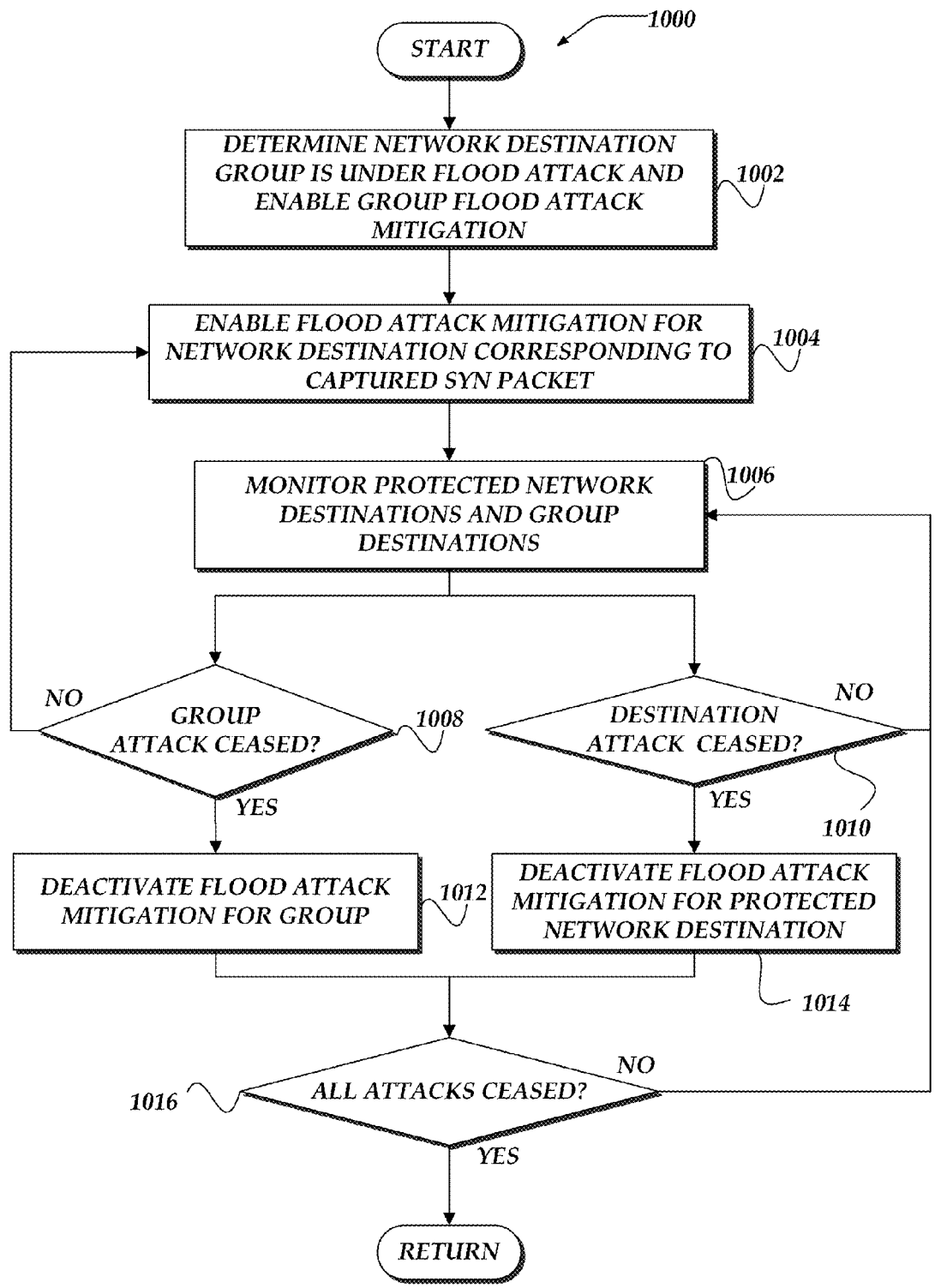
FIG. 10 shows a flowchart for a process for flood attack mitigation for flood attacks, in accordance with at least one of the various embodiments.

FIG. 10 shows a flowchart for process 1000 for flood attack mitigation for flood attacks in accordance with at least one of the various embodiments. After a start block, at block 1002, the PTMD may determine that one or more groups of network destinations may be targeted by a flood attack. In at least one of the various embodiments, since the PTMD may be arranged to capture/generate network traffic metrics aggravated for a group of network destinations, if one or more of those metrics exceeds a defined threshold, the PTMD may determine that one or more of the network destinations comprising the group may be the target of a flood attack.

At block 1004, in at least one of the various embodiments, the PTMD may be arranged to enable one or more flood attack mitigation procedures for the group and/or one or more of the network destinations that may be targeted by the flood attack. Groups and/or network destinations that are subject to flood attack mitigation procedures may be classified as being protected by the PTMD.

In at least one of the various embodiments, group flood mitigation procedures may include increasing the monitoring of network traffic for the entire group of network destinations. For example, reducing the cache priority connection associated with the group, traffic priority demotion for network traffic for each network destination that may be associated with the group, or the like.

In at least one of the various embodiments, as the group may be under attack, the PTMD may be arranged to take further steps to determine the one or more a network destinations within the group may be targeted by the flood attack. For example, even though the group may be determined to be subject to a flood attack, the attack may be directed at just a portion (one or more) of the network destinations included in the group.

Accordingly, in at least one of the various embodiments, the PTMD may be arranged to capture network information that may correspond to one of the network destinations within the group. For example, the PTMD may be arranged to determine a network destination under attack by employing method described in block 904 in FIG. 9. Likewise, in at least one of the various embodiments, if a network destination that is under attack is determined, the PTMD may be arranged to perform actions as described in block 906 of FIG. 9 for flood attack mitigation.

At block 1006, in at least one of the various embodiments, the PTMD may be arranged to monitor the network communication for the one or more protected network destinations as well as the network communication for the rest of the group. In at least one of the various embodiments, the PTMD may be monitoring network communications to determine if the one or more protected network destinations may still be targeted by a flood attack. Likewise, the PTMD may be monitoring the network communication to determine if a flood attack may be impacting network communication of the group as a whole.

At decision block 1008, in at least one of the various embodiments, if the PTMD determines that the group may be still undergoing the effects of a flood attack, control may loop back to block 1004; otherwise, control may flow to block 1012. In at least one of the various embodiments, if a flood attack may be still impacting the group (e.g., one or more group level metrics exceed a defined threshold), the PTMD may continue to apply group level flood mitigation. Also, since one or more unprotected network destinations comprising the group may be the target of a flood attack, the PTMD may perform the actions described for block 1004 to find another network destination that may require protecting.

At decision block 1010, in at least one of the various embodiments, if the PTMD determines that a flood attack directed at one or more protected network destinations may have ceased, control may flow to block 1014; otherwise control may loop back block 1006. In at least one of the various embodiments, the PTMD may determine if the flood attack has ceased based on one or more metrics, such as, those discussed above, for determining if a flood attack on a particular network destination has ceased.

At block 1012, in at least one of the various embodiments, if the group level metrics indicate that the group as a whole is no longer targeted by a flood attack, the PTMD may be arranged to deactivate the one or more group level flood attack mitigation procedures that may have been activated. Next, control may flow to decision block 1016.

At block 1014, in at least one of the various embodiments, if the network communication metrics for the protected network destination indicate that the network destination is not targeted by a flood attack, the PTMD may be arranged to deactivate the one or more network destination flood attack mitigation procedures that may have been activated. Next, control may flow to decision block 1016.

At decision block 1016, in at least one of the various embodiments, if the PTMD determines that all determined flood attacks have ceased, control may be returned to a calling process; otherwise, control may loop back to block 1006 enabling the PTMD to continue monitoring the network communication of the one or more protected network destinations.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing examples should not be construed as limiting and/or exhaustive, but rather, an illustrative use case to show an implementation of at least one of the various embodiments of the invention.

What is claimed as new and desired to be protected by Letters Patent of the United States is:

1. A method to manage communication over a network with one or more packet traffic management devices (PTMD) with one or more processors executing the method that performs actions, comprising:
    monitor, by one or more processors on the one or more PTMDs, one or more group performance metrics for a plurality of network flows associated with a group of servers; and
    when the one or more group performance metrics indicate a flood attack of packets on one or more network flows of the plurality of network flows associated with the group of servers a processor on the one or more PTMDs, performs further actions, including:
        activate, by the one or more processors on the one or more PTMDs, one or more group mitigation procedures on each network destination associated with the group of servers;
        determine, by the one or more processors on the one or more PTMDs, one or more network destinations that are separately targeted for the flood attack based on at least network traffic on the one or more network flows;
        activate, by the one or more processors on the one or more PTMDs, one or more mitigation procedures on the one or more separately targeted network destinations;
        monitor, by the one or more processors on the one or more PTMDs, network traffic that is communicated to the one or more separately targeted network destinations and to each other network destination associated with the group of servers;
        when the one or more group performance metrics indicate that the flood attack is continuing for the group of servers as a whole, determine, by the one or more processors on the one or more PTMDs, one or more other network destinations that are separately targeted for the flood attack based on at least network traffic on the one or more network flows, wherein the one or more mitigation procedures are activated on the one more other network destinations;
        when the one or more group performance metrics indicate that the flood attack is over for the group of servers as a whole, deactivate, by the one or more processors on the one or more PTMDs, the one or more group mitigation procedures; and
        when one or more characteristics of the monitored network traffic indicate that the flood attack is over for the one or more separately targeted network destinations, deactivate, by the one or more processors on the one or more PTMDs, the one or more mitigation procedures for the one or more separately targeted network destinations.

2. The method of claim 1, wherein determining the one or more separately targeted network destinations, further comprises:
    extracting one or more SYN packets from one or more network flows; and
    employing network traffic information in the one or more SYN packets to determine the one or more separately targeted network destinations.

3. The method of claim 1, wherein activating the one or more mitigation procedures, further comprises, enabling SYN-Cookies for the one or more network flows that correspond to the one or more separately targeted network destinations.

4. The method of claim 1, wherein the one or more group performance metrics, further comprises, a ratio of incoming SYN packets to a count of SYN_ACK packet errors that occur within a defined time window.

5. The method of claim 1, wherein monitoring the one or more group performance metrics, further comprises:
    aggregating values of the one or more group performance metrics into a plurality of hash buckets based on the network address information associated with each of the plurality of network flows; and
    when a value in one or more hash buckets of the plurality of hash buckets exceeds a threshold, determining that the flood attack is in progress.

6. The method of claim 1, wherein determining the one or more separately targeted network destinations, further comprises:
    determining source network address information that is associated with the one or more separately targeted network destinations; and directing the activation of the one or more mitigation procedures to the one or more determined network flows based on at least the source network address information.

7. The method of claim 1, further comprising, distribute, by the one or more processors, one or more flood attack detection procedures and one or more flood attack mitigation procedures to at least one of one or more control segments, or one or more data flow segments.

8. A network computer that manages communication over a network, comprising:
   a transceiver that communicates over the network;
   a memory that stores at least instructions;
   one or more processor devices that execute instructions that perform operations, including:
      monitoring one or more group performance metrics for a plurality of network flows associated with a group of servers; and
      when the one or more group performance metrics indicate a flood attack of packets on one or more network flows of the plurality of network flows associated with the group of servers, performing further actions, including:
         activating, one or more group mitigation procedures on each network destination associated with the group of servers;
         determining one or more network destinations that are separately targeted for the flood attack based on at least network traffic on the one or more network flows;
         activating one or more mitigation procedures on the one or more separately targeted network destinations;
         monitoring network traffic that is communicated to the one or more separately targeted network destinations and to each other network destination associated with the group of servers;
         when the one or more group performance metrics indicate that the flood attack is continuing for the group of servers as a whole, determine, by the one or more processors on the one or more PTMDs, one or more other network destinations that are separately targeted for the flood attack based on at least network traffic on the one or more network flows, wherein the one or more mitigation procedures are activated on the one more other network destinations;
         when the one or more group performance metrics indicate that the flood attack is over for the group of servers as a whole, deactivating the one or more group mitigation procedures; and
         when one or more characteristics of the monitored network traffic indicate that the flood attack is over for the one or more separately targeted network destinations, deactivating the one or more mitigation procedures for the one or more separately targeted network destinations.

9. The network computer of claim 8, wherein determining the one or more separately targeted network destinations, further comprises:
   extracting one or more SYN packets from one or more network flows; and
   employing network traffic information in the one or more SYN packets to determine the one or more separately targeted network destinations.

10. The network computer of claim 8, wherein activating the one or more mitigation procedures, further comprises, enabling SYN-Cookies for the one or more network flows that correspond to the one or more separately targeted network destinations.

11. The network computer of claim 8, wherein the one or more group performance metrics, further comprises, a ratio of incoming SYN packets to a count of SYN_ACK packet errors that occur within a defined time window.

12. The network computer of claim 8, wherein monitoring the one or more group performance metrics, further comprises:
   aggregating values of the one or more group performance metrics into a plurality of hash buckets based on the network address information associated with each of the plurality of network flows; and
   when a value in one or more hash buckets of the plurality of hash buckets exceeds a threshold, determining that the flood attack is in progress.

13. The network computer of claim 8, wherein determining the one or more separately targeted network destinations, further comprises:
   determining source network address information that is associated with the one or more separately targeted network destinations; and
   directing the activation of the one or more mitigation procedures to the one or more determined network flows based on at least the source network address information.

14. The network computer of claim 8, wherein the one or more network computer processor devices execute instructions that perform actions, further comprising, distributing one or more flood attack detection procedures and one or more flood attack mitigation procedures to at least one of one or more control segments, or one or more data flow segments.

15. A processor readable non-transitory storage media that includes instructions to manage communication over a network, wherein a network computer with one or more processors executes at least a portion of the instructions that perform operations, comprising:
   monitoring one or more group performance metrics for a plurality of network flows associated with a group of servers; and
   when the one or more group performance metrics indicate a flood attack of packets on one or more network flows of the plurality of network flows associated with the group of servers, performing further actions, including:
      activating, one or more group mitigation procedures on each network destination associated with the group of servers;
      determining one or more network destinations that are separately targeted for the flood attack based on at least network traffic on the one or more network flows;
      activating one or more mitigation procedures on the one or more separately targeted network destinations;
      monitoring network traffic that is communicated to the one or more separately targeted network destinations and to each other network destination associated with the group of servers;
      when the one or more group performance metrics indicate that the flood attack is continuing for the group of servers as a whole, determine, by the one or more processors on the one or more PTMDs, one or more other network destinations that are separately targeted for the flood attack based on at least network traffic on the one or more network flows, wherein the one or more mitigation procedures are activated on the one more other network destinations;

when the one or more group performance metrics indicate that the flood attack is over for the group of servers as a whole, deactivating, the one or more group mitigation procedures; and when one or more characteristics of the monitored network traffic indicate that the flood attack is over for the one or more separately targeted network destinations, deactivating the one or more mitigation procedures for the one or more separately targeted network destinations.

16. The media of claim 15, wherein determining the one or more separately targeted network destinations, further comprises:

extracting one or more SYN packets from one or more network flows; and employing network traffic information in the one or more SYN packets to determine the one or more separately targeted network destinations.

17. The media of claim 15, wherein activating the one or more mitigation procedures, further comprises, enabling SYN-Cookies for the one or more network flows that correspond to the one or more separately targeted network destinations.

18. The media of claim 15, wherein the one or more group performance metrics, further comprises, a ratio of incoming SYN packets to a count of SYN_ACK packet errors that occur within a defined time window.

19. The media of claim 15, wherein monitoring the one or more group performance metrics, further comprises:

aggregating values of the one or more group performance metrics into a plurality of hash buckets based on the network address information associated with each of the plurality of network flows; and when a value in one or more hash buckets of the plurality of hash buckets exceeds a threshold, determining that the flood attack is in progress.

20. The media of claim 15, wherein determining the one or more separately targeted network destinations, further comprises:

determining source network address information that is associated with the one or more separately targeted network destinations; and directing the activation of the one or more mitigation procedures to the one or more determined network flows based on at least the source network address information.

21. The media of claim 15, further comprising, distributing one or more flood attack detection procedures and one or more flood attack mitigation procedures to at least one of one or more control segments, or one or more data flow segments.

22. A system arranged to manage communication over a network, comprising:

a network computer, including:
 a transceiver that communicates over the network;
 a memory that stores at least instructions;
 one or more processor devices that execute instructions that perform operations, including:
  monitoring one or more group performance metrics for a plurality of network flows associated with a group of servers; and
  when the one or more group performance metrics indicate a flood attack of packets on one or more network flows of the plurality of network flows associated with the group of servers, performing further actions, including:
   activating, one or more group mitigation procedures on each network destination associated with the group of servers;
   determining one or more network destinations that are separately targeted for the flood attack based on at least network traffic on the one or more network flows;
   activating one or more mitigation procedures on the one or more separately targeted network destinations;
   monitoring network traffic that is communicated to the one or more separately targeted network destinations and to each other network destination associated with the group of servers;
   when the one or more group performance metrics indicate that the flood attack is continuing for the group of servers as a whole, determine, by the one or more processors on the one or more PTMDs, one or more other network destinations that are separately targeted for the flood attack based on at least network traffic on the one or more network flows, wherein the one or more mitigation procedures are activated on the one more other network destinations;
   when the one or more group performance metrics indicate that the flood attack is over for the group of servers as a whole, deactivating, the one or more group mitigation procedures; and
   when one or more characteristics of the monitored network traffic indicate that the flood attack is over for the one or more separately targeted network destinations, deactivating the one or more mitigation procedures for the one or more separately targeted network destinations; and a client computer, comprising:
 a transceiver that communicates over the network;
 a memory that stores at least instructions;
 one or more processor devices that execute instructions that perform operations, including:
  providing network traffic to the one or more network flows.

23. The system of claim 22, wherein determining the one or more separately targeted network destinations, further comprises:

extracting one or more SYN packets from one or more network flows; and employing network traffic information in the one or more SYN packets to determine the one or more separately targeted network destinations.

24. The system of claim 22, wherein activating the one or more mitigation procedures, further comprises, enabling SYN-Cookies for the one or more network flows that correspond to the one or more separately targeted network destinations.

25. The system of claim 22, wherein the one or more group performance metrics, further comprises, a ratio of incoming SYN packets to a count of SYN_ACK packet errors that occur within a defined time window.

26. The system of claim 22, wherein monitoring the one or more group performance metrics, further comprises:

aggregating values of the one or group performance metrics into a plurality of hash buckets based on the network address information associated with each of the plurality of network flows; and when a value in one or more hash buckets of the plurality of hash buckets exceeds a threshold, determining that the flood attack is in progress.

27. The system of claim 22, wherein determining the one or more separately targeted network destinations, further comprises:
   determining source network address information that is associated with the one or more separately targeted network destinations; and
   directing the activation of the one or more mitigation procedures to the one or more determined network flows based on at least the source network address information.

28. The system of claim 22, wherein the network computer one or more processor devices execute instructions that perform further operations, comprising, distributing one or more flood attack detection procedures and one or more flood attack mitigation procedures to at least one of one or more control segments, or one or more data flow segments.

* * * * *